(12) United States Patent
Vakil et al.

(10) Patent No.: US 9,721,294 B1
(45) Date of Patent: Aug. 1, 2017

(54) APPARATUS AND METHOD FOR EVALUATING AND PRESENTING SUPPLY CHAIN CONDITION OF AN ENTERPRISE

(75) Inventors: Bindiya Vakil, Fremont, CA (US); Sumit A. Vakil, Fremont, CA (US)

(73) Assignee: Resilinc Corporation, Fremont, CA (US)

(*) Notice: Subject to any disclaimer, the term of this patent is extended or adjusted under 35 U.S.C. 154(b) by 22 days.

(21) Appl. No.: 13/598,065

(22) Filed: Aug. 29, 2012

Related U.S. Application Data

(60) Provisional application No. 61/529,066, filed on Aug. 30, 2011.

(51) Int. Cl.
*G06Q 40/00* (2012.01)

(52) U.S. Cl.
CPC .................................... *G06Q 40/00* (2013.01)

(58) Field of Classification Search
CPC ........... G06Q 10/06315; G06Q 10/087; G06Q 10/06; G06Q 10/08
See application file for complete search history.

(56) References Cited

U.S. PATENT DOCUMENTS

2006/0015416 A1* 1/2006 Hoffman et al. ............... 705/28

OTHER PUBLICATIONS

DRK Research and Consulting LLC, "Supply Risk Assessment", DRK Research and Consulting LLC, downloaded from http://www.drkresearch.org/rm_marketing_overview_v4_drk.doc on May 11, 2015, 6 pages.
DRK Research and Consulting LLC, "Supply Risk Assessment Process", DRK Research and Consulting LLC, downloaded from http://www.drkresearch.org/clients/scrm_workshop/5-supply_risk_assessment_process.ppt on May 11, 2015, 11 pages.
Harrington, et al, "Governing Tangible Risk: The SCOR Model". In X-SCM: The New Science of X-treme Supply Chain Management (pp. 95-103). New York, NY: Routledge (2011), 13 pages.
Morrow, et al, "Managing Risk in Your Organization with the SCOR Methodology", Supply Chain Council, Inc., downloaded from https://www.google.com/url?sa=t&rct=j&q=&esrc=s&source=web&cd=1&ved=0CCMQFjAA&url=http%3A%2F%2Fwww.husdal.com%2Fwp-content%2Fuploads%2F2010%2F08%2Fscs-scrm.ppt&ei=liVRVcvNKMfhoASnooGoCQ&usg=AFQjCNEv4OXgp8cvbxGr2XWxRRKM1RukgA&bvm=bv.93112503, d.cGU&cad=rja 48 pages.

* cited by examiner

*Primary Examiner* — Shay S Glass
(74) *Attorney, Agent, or Firm* — Sunstein Kann Murphy & Timbers LLP

(57) ABSTRACT

The present application is directed to, among other things, a computer-automated method of presenting data relating to a supply chain. The method may include using stored parts data of the enterprise, including content of a bill of materials for at least one of a product or a group of products, and, for each part in the bill of materials and a list of approved sources for such part, risk data associated therewith. The method may include using stored supplier data. The method may include computing supply chain data, including at least one of revenue impact and risk score, corresponding to the at least one of the product and the group of products, of the enterprise, wherein the data is aggregated according to geographic region. The method may include serving graphical information wherein the computed supply chain data is represented on a map on the basis of geographic region.

10 Claims, 17 Drawing Sheets

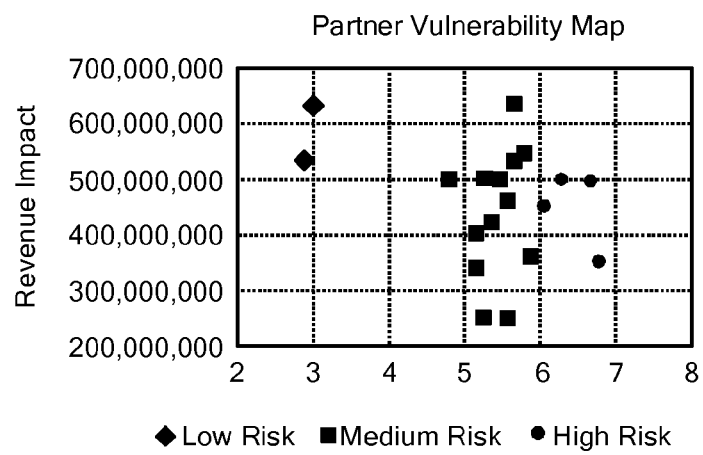

| Partner | Resiliency Score | Revenue Impact |
|---|---|---|
| Wagner Specialty Royal Specialties | 6.3 | $493,282,763 |
| Memory Power Informational | 5.8 | $531,801,565 |
| American Computer Medical | 5.3 | $249,070,672 |
| Riley Motors | 4.8 | $493,282,763 |
| Recreational Unlimited Strategic | 6.7 | $493,282,763 |
| Personal Logistics Consumables | 5.2 | $336,010,898 |
| International Chemical | 5.7 | $625,089,810 |
| Wolfe Metals Of Augusta | 5.4 | $418,401,352 |
| Japanese Mechanical Corporation | 3 | $625,089,810 |
| Moon Gas Data Wholesale | 2.9 | $524,598,756 |
| Advanced Imperial Financial | 5.6 | $249,070,672 |

| ◈ Site Activities | | New Site Activity \| Upload Parts \| CSV Templates | Site Activities Help ⓘ |
|---|---|---|---|
| Action | Site Activity Id | Activity | Upload Parts | Recovery Time |
| ☐ \| Edit \| Del | SAct-03816 | Assembly mount | | 38 |
| ☐ \| Edit \| Del | SAct-03817 | Clean Room Assembly | | 35 |
| ☐ \| Edit \| Del | SAct-03832 | 3PL | | 8 |
| ☐ \| Edit \| Del | SAct-03833 | Assembly | | 11 |

∧ Back To Top        Always show the ▼ more records per related list

FIG. 11

| Part Number | Part Description | Alt Site Qualified? | EoL Date |
|---|---|---|---|
| | | | |

FIG. 12

| Sites | Customer Parts | Customer Products | Resiliency Analytics |

Resiliency Survey

Save  Cancel

BCP Section

| Question | Answer |
|---|---|
| Does your site have a written business continuity plan (BCP)? | -None- ▼ |
| Have you established clear trigger points for activating the BCP? | -None- ▼ |
| Have you documented personnel at this site that will activate your BCP and execute on the recovery plan? | -None- ▼ |
| Are these responders trained to activate your BCP and execute on the recovery plans? | -None- ▼ |
| Have you conducted a test of this site's BCP and recovery plans in the past 12 months? | -None- ▼ |
| Is there a plan in place to ensure all gaps identified in the test are closed? | -None- ▼ |
| Do you have backup copies of all procedures, processes and policies to manufacture and ship your product? | -None- ▼ |
| If your site has any customer or other partner owned equipment, do you have this documented? | -None- ▼ |
|  | -None- ▼ |

Communications Section

| Question | Answer |
|---|---|
| Does this site have a functioning backup communications infrastrucure like a satellite phone for use in emergencies? | -None- ▼ |
| Does this site have a team that is responsible for communicating with customers in a crisis? | -None- ▼ |

Risks Section

| Question | Answer |
|---|---|
| Have you considered the types of risks associated with your immediate environment eg. Earthquake/hurricane zone, frequent flooding in your area etc? | -None- ▼ |
| Have you taken steps to protect your site from all known risks that affect locations in this area? | -None- ▼ |

Emergency Response Section

| Question | Answer |
|---|---|
| Has your site identified key personnel for an emergency response team? | -None- ▼ |
| Do they know how to contact the key emergency response service personnel-fire, police etc? | -None- ▼ |
| Do you or the owners of this facility have contracts with a facility restoration company? | -None- ▼ |
| If yes, does your emergency response team have all the information it needs to get your facility restoration crew in, in case of an event? | -None- ▼ |
| Is your emergency response team aware of how to get building repair contractors and services personnel in? | -None- ▼ |

Transportation Section

| Question | Answer |
|---|---|
| Have you documented all primary and alternate transportation routes and modes for this facility? | -None- ▼ |

Labor Section

| Question | Answer |
|---|---|
| In case of a labor strike, widespread absenteeism, pandemic type scenario, do you have access to a contingency labor force which can provide support? What % of this sites output can be operational with contingency labor force? | -None- ▼ |

Alternate Site Section

| Question | Answer |
|---|---|
| Does this site have an alternate facility where operations can be moved in case of a disruption? | -None- ▼ |
| Do you have clear guidelines established for moving operations to the alternate site vs. recovering at the primary site? | -None- ▼ |
| Do you have a relocation program to move key employees to the alternate facility? | -None- ▼ |
| Do you have ongoing relationships or contracts with equipment suppliers to supply equipment needed at the alternate site? | |
| Do you have systems in place to transfer key manufacturing data (BOM, AVL etc) to the alternate to continue operations there? | -None- ▼ |
| If your primary site were disrupted, what % of the primary site's output could be supported by the alternate site? | -None- ▼ |

Security Section

| Question | Answer |
|---|---|
| Does this facility control access to ensure only authorized personnel are able to enter the building on a 24x7 basis? | -None- ▼ |

Safety Section

| Question | Answer |
|---|---|
| Do you have safe and clean facilities to handle hazardous or inflammable materials used as inventory or in manufacturing? | -None- ▼ |
| Are these materials kept in a safe and secure location to prevent accidents and fires? | -None- ▼ |
| Does this site have an automatic sprinkler system that can get activated in a fire? | -None- ▼ |

*FIG. 18*

APPARATUS AND METHOD FOR EVALUATING AND PRESENTING SUPPLY CHAIN CONDITION OF AN ENTERPRISE

RELATED APPLICATIONS

The present application claims priority to U.S. Application No. 61/529,066, entitled "Apparatus and Method for Evaluation and Presenting Supply Chain Condition of an Enterprise" and filed Aug. 30, 2011, the contents of which are hereby incorporated by reference in their entirety.

TECHNICAL FIELD

The present invention relates to computer-implemented apparatus and methods for evaluating condition of an enterprise, and more particularly to such apparatus and methods for evaluating supply chain condition of an enterprise.

BACKGROUND ART

Supply chain risk management is known in the art, and the following books and articles contain information that is typical of the prior art: The Resilient Enterprise: Overcoming Vulnerability for Competitive Advantage by Yossi Sheffi published 2005. Single Point of Failure: The 10 Essential Laws of Supply Chain Risk Management by Gary Lynch published 2009, Supply Chain Risk Management: Minimizing Disruptions in Global Sourcing (Resource Management) by Robert Handfield and Kevin P. McCormack published 2007. Supply Chain Risk: A Handbook of Assessment, Management, and Performance (International Series in Operations Research & Management Science) by George A. Zsidisin and Bob Ritchie published 2010. Supply Chain Risk Management: Vulnerability and Resilience in Logistics by C. D. J. Waters published 2007. Managing Global Supply and Risk: Best Practices, Concepts, and Strategies by Robert J. Trent and Llewellyn Roberts published 2009. Aberdeen Group Report on Supply Chain Risk Management: Building a Resilient Global Supply Chain from July 2008. Each of the foregoing references is incorporated herein by reference.

SUMMARY OF THE EMBODIMENTS

In a first embodiment of the invention there is provided a computer-automated method of presenting data relating to a supply chain of an enterprise. In this embodiment, the method includes:

using stored parts data of the enterprise, including content of a bill of materials for at least one of a product and a group of products, and, for each part in the bill of materials and a list of approved sources for such part, risk data associated therewith;

using stored supplier data, including manufacturing, distribution, and storage locations;

in a first computer process, computing supply chain data, including at least one of revenue impact and risk score, corresponding to the at least one of the product and the group of products, of the enterprise, wherein the data is aggregated according to geographic region; and serving graphical information wherein the computed supply chain data is represented on a map on the basis of geographic region.

In a further related embodiment, the supply chain data includes both revenue impact and risk score. Alternatively, the supply chain data includes at least one of revenue impact and risk score. In another further related embodiment, the supply chain data includes both expenditure impact and risk score. Alternatively, the supply chain data includes at least one of expenditure impact and risk score.

In another embodiment, the invention provides a computer-automated method of presenting data relating to a supply chain of an enterprise. The method of this embodiment includes:

using stored data with respect to distinct instances of an item selected from the group consisting of product, group of products, supplier, site, business unit, product family, product, SKU, part, country, category, and supplier's supplier;

in a first computer process, computing supply chain data, including both revenue impact and risk score, for the distinct instance of the item; and serving graphical information defining a scatter plot, for the enterprise, mapping the revenue impact on one axis and the risk score on the other axis, with respect to the distinct instances of the selected item.

Optionally, the supply chain data includes at least one of expenditure impact and risk score.

In another embodiment, the invention provides a computer-automated method of presenting data relating to a supply chain of an enterprise. The method of this embodiment includes:

using stored data with respect to distinct instances of an item selected from the group consisting of product, group of products, supplier, site, business unit, product family, product, SKU, part, country, category, and supplier's supplier;

in a first computer process, computing supply chain data, including both expenditure impact and risk score, for the distinct instance of the item; and serving graphical information defining a scatter plot, for the enterprise, mapping the expenditure impact on one axis and the risk score on the other axis, with respect to the distinct instances of the selected item.

In another embodiment, the invention provides a computer-automated method of determining an index that is a single-valued measure of supply chain resiliency of an enterprise. The method includes computer processes as follows:

using stored parts data of the enterprise pertinent to resiliency, including content of a bill of materials for the product, and, for each part in the bill of materials, a list of approved sources for such part, historical performance of suppliers as to delivery reliability and part quality;

using stored supplier data, including with reference to at least two of: (i) manufacturing, distribution, and storage locations and (ii) at least one of business continuity, site recovery time and time to resume supply, and (iii) last time buy date associated with any part;

using stored acquired data, including with reference to: (i) financial risk as to each supplier, with respect to at least one of creditworthiness, bankruptcy risk, and financial health and (ii) location risk, with respect to at least one of natural disaster, geopolitical, and macro-economic risk for the sites, used by each supplier, for at least one of manufacturing, storage, and distribution of a part;

calculating a parts count of parts in the bill of materials;

determining which of the parts in the bill of materials are single sourced;

calculating, for each SKU, for each product, for each product family, and for each business unit of the enterprise parts scores, wherein the parts scores correspond to at least two of the following scores:

(a) single source dependency score as a fraction of the parts count in the bill of materials, for a product, that are single sourced;

(b) parts risk score as a fraction of parts, of the single sourced parts, having a part risk score over a defined threshold;

(c) parts recovery time score as a fraction, of the single sourced parts, having a recovery time over a defined threshold;

(d) time to resume supply score as a fraction, of the single source parts, a time to resume supply over a defined threshold;

(e) last time buy score as a number of parts in the product that are last-time buy parts;

calculating a manufacturing risk score as a fraction of sites for manufacturing of product or subassemblies, whether in house or outsourced, having a location risk score, a recovery risk score, or, in case of outsourced manufacturing only, a financial risk score over a defined threshold; and calculating the index as a function of the calculated scores.

Optionally, the method further includes calculating a high risk supplier score as a fraction of suppliers posing a high financial, location, operational, or recovery risk. Also optionally, calculating parts scores includes calculating parts scores corresponding to at least three of the following scores. As another option calculating parts scores includes calculating parts scores corresponding to at least four of the following scores. As yet another option, calculating parts scores includes calculating parts scores corresponding to all of the following scores.

In yet another embodiment, the invention provides a computer-automated method of determining an index that is a single-valued measure of risk associated with an enterprise's supplier. The method of this embodiment includes computer processes as follows:

using stored parts data of the enterprise, including a list of parts sourced from the supplier, historical performance of the supplier as to delivery reliability and part quality;

using stored supplier data, including with reference to (i) manufacturing, distribution, and storage locations and (ii) at least one of business continuity, site recovery time and time to resume;

using stored acquired data, including with reference to (i) financial risk as to each supplier, with respect to at least one of creditworthiness, bankruptcy risk, and financial health and (ii) location risk, with respect to at least one of natural disaster, geopolitical, and macro-economic risk for the sites, used by the supplier, for at least one of manufacturing, storage, and distribution of a part;

associating, for the supplier, a score in at least one of the following dimensions:

a. financial risk, with respect to at least one of creditworthiness, bankruptcy risk, and financial health;

b. location risk, with respect to at least one of natural disaster, geopolitical, and macro-economic risk, for the sites, used by the supplier, for at least one of manufacturing, storage, and distribution of parts; and c. operational risk, based on historical performance of the supplier as to delivery reliability and part quality;

calculating, for the supplier, a recovery risk score for the sites, used by the supplier, for at least one of manufacturing, storage, and distribution of parts; and calculating a supplier risk score as a function of the associated and calculated scores.

In another embodiment, the invention provides a computer-automated method of determining an index that is a single-valued measure of risk associated with a site used by an enterprise's supplier, either directly or through outsourcing, for at least one of manufacturing, storage, and distribution of parts. In this embodiment wherein the site has an owner, and the method includes computer processes as follows:

using stored supplier data pertinent to the site, including the owner of the site, and at least one of business continuity, site recovery time and time to resume supply;

using stored acquired data, including with reference to (i) financial risk as to the owner of the site, with respect to at least one of creditworthiness, bankruptcy risk, and financial health and (ii) location risk, with respect to at least one of natural disaster, geopolitical, and macro-economic risk for the site;

associating, for the site, a score in at least one of the following dimensions:

a. financial risk as to the owner of the site, with respect to at least one of creditworthiness, bankruptcy risk, and financial health;

b. location risk, with respect to at least one of natural disaster, geopolitical, and macro-economic risk; and calculating, for the site, a recovery risk score using the stored supplier data; and calculating a site risk score as a function of the associated and calculated scores.

Yet another embodiment of the invention provides a computer-automated method of determining an index that is a single-valued measure of risk associated with a part furnished to an enterprise by a supplier. The method of this embodiment includes computer processes as follows:

using stored parts data of the enterprise, including historical performance of the supplier as to delivery reliability and part quality as to the part;

using stored supplier data, pertinent to the part including with reference to (i) manufacturing, distribution, and storage locations and (ii) at least one of recovery time, time to resume supply, and business continuity;

using stored acquired data, including with reference to (i) financial risk as to the supplier, with respect to at least one of creditworthiness, bankruptcy risk, and financial health and (ii) location risk, with respect to at least one of natural disaster, geopolitical, and macro-economic risk for any sites used for at least one of manufacturing, distribution, and storage of the part;

associating, for the part, a score in at least one of the following dimensions:

a. financial risk as to the supplier, with respect to at least one of creditworthiness, bankruptcy risk, and financial health;

b. location risk, with respect to at least one of natural disaster, geopolitical, and macro-economic risk for any sites, used by the supplier, for at least one of manufacturing, storage, and distribution of the part;

c. operational risk, based on historical performance as to delivery reliability and part quality as to the part; and calculating, for the part, a recovery risk score based at least one of recovery time, time to resume supply, and business continuity and adjusted when a redundancy is found at least in manufacturing; and calculating a part risk score as a function of the associated and calculated scores.

Another embodiment of the invention provides a computer-automated method of determining an index that is a single-valued measure of risk associated with manufacturing capability of an enterprise. The method of this embodiment, includes computer processes as follows:

using stored enterprise data relating to at least one of recovery time, time to resume supply, and business continuity for each site used by the enterprise, whether in-house or outsourced, for manufacturing of product or subassemblies;

using stored acquired data, including with reference to (i) location risk, with respect to at least one of natural disaster, geopolitical, and macro-economic risk for each site used for manufacturing of product or subassemblies; and, in the case of outsourced manufacturing only, (ii) financial risk as to the manufacturer, with respect to at least one of creditworthiness, bankruptcy risk, and financial health;

for each site for manufacturing of product or subassemblies, whether in-house or outsourced:
  a. calculating a location risk score, with respect to at least one of natural disaster, geopolitical, and macro-economic risk for the site;
  b. calculating a recovery risk score; and
  c. in case of outsourced manufacturing only, calculating a financial risk score based on financial risk as to the manufacturer, with respect to at least one of creditworthiness, bankruptcy risk, and financial health; and calculating a manufacturing risk score as a fraction of sites for manufacturing of product or subassemblies, whether in house or outsourced, having a location risk score, a recovery risk score, or, in case of outsourced manufacturing only, a financial risk score over a defined threshold.

In yet another embodiment of the invention there is provided a non-volatile digital storage medium encoded with instructions that, when loaded into a digital computer, configure the computer to implement a computer-automated method of presenting data relating to a supply chain of an enterprise, and the method includes using stored parts data of the enterprise, including content of a bill of materials for at least one of a product or a group of products, and, for each part in the bill of materials and a list of approved sources for such part, risk data associated therewith;

using stored supplier data, including manufacturing, distribution, and storage locations;

in a first computer process, computing supply chain data, including at least one of revenue impact and risk score, corresponding to the at least one of the product and the group of products, of the enterprise, wherein the data is aggregated according to geographic region; and serving graphical information wherein the computed supply chain data is represented on a map on the basis of geographic region.

In a further related embodiment, the supply chain data includes both revenue impact and risk score. Optionally, the supply chain data includes at least one of expenditure impact and risk score. Optionally, the supply chain data includes both expenditure impact and risk score.

In another embodiment, the invention provides a non-volatile digital storage medium encoded with instructions that, when loaded into a digital computer, configure the computer to implement a computer-automated method of presenting data relating to a supply chain of an enterprise. The method includes:

using stored data with respect to distinct instances of an item selected from the group consisting of product, group of products, supplier, site, business unit, product family, product, SKU, part, country, category, and supplier's supplier;

in a first computer process, computing supply chain data, including both revenue impact and risk score, for the distinct instance of the item; and serving graphical information defining a scatter plot, for the enterprise, mapping the revenue impact on one axis and the risk score on the other axis, with respect to the distinct instances of the selected item.

Optionally, the supply chain data includes both revenue impact and risk score. Alternatively, the supply chain data includes at least one of expenditure impact and risk score. Optionally, the supply chain data includes both expenditure impact and risk score.

In another embodiment, the invention provides a non-volatile digital storage medium encoded with instructions that, when loaded into a digital computer, configure the computer to implement a computer-automated method of determining an index that is a single-valued measure of supply chain resiliency of an enterprise. The method includes computer processes as follows:

using stored parts data of the enterprise pertinent to resiliency, including content of a bill of materials for the product, and, for each part in the bill of materials, a list of approved sources for such part, historical performance of suppliers as to delivery reliability and part quality;

using stored supplier data, including with reference to at least two of: (i) manufacturing, distribution, and storage locations and (ii) at least one of business continuity, site recovery time and time to resume supply, (iii) last time buy date associated with any part;

using stored acquired data, including with reference to (i) financial risk as to each supplier, with respect to at least one of creditworthiness, bankruptcy risk, and financial health and (ii) location risk, with respect to at least one of natural disaster, geopolitical, and macro-economic risk for the sites, used by each supplier, for at least one of manufacturing, storage, and distribution of a part;

calculating a parts count of parts in the bill of materials;

determining which of the parts in the bill of materials are single sourced;

calculating, for each SKU, for each product, for each product family, and for each business unit of the enterprise parts scores, wherein the parts scores correspond to at least two of the following scores:
  (a) single source dependency score as a fraction of the parts count in the bill of materials, for a product, that are single sourced;
  (b) parts risk score as a fraction of parts, of the single sourced parts, having a part risk score over a defined threshold;
  (c) parts recovery time score as a fraction, of the single sourced parts, having a recovery time over a defined threshold;
  (d) time to resume supply score as a fraction, of the single source parts, a time to resume supply over a defined threshold;
  (e) last time buy score as a number of parts in the product that are last-time buy parts;

calculating a manufacturing risk score as a fraction of sites for manufacturing of product or subassemblies, whether in house or outsourced, having a location risk score, a recovery risk score, or, in case of outsourced manufacturing only, a financial risk score over a defined threshold; and calculating the index as a function of the calculated scores. [This section will be prepared last, and is simply a paraphrase of the claims.

BRIEF DESCRIPTION OF THE DRAWINGS

The foregoing features of embodiments will be more readily understood by reference to the following detailed description, taken with reference to the accompanying drawings, in which:

FIG. 1 is a representation of a customer report, in this case a vulnerability scatter plot graph, in accordance with an embodiment of the present invention, providing to a user a view of critical elements of the supply chain of an enterprise, in which for each of a selectable series of layers of the enterprise, supply chain risk is plotted from a revenue impact and risk score standpoint;

FIG. 10 is a representation of a user interface screen by which a partner can provide data specific to a particular site of the partner;

FIG. 11 is a representation of a lower portion of the same screen as in FIG. 10, showing further data that can be provided by a partner with respect to the particular site;

FIG. 12 is a representation of a screen, related to the screen of FIGS. 10 and 11, by which a partner can provide data relating to a particular part supplied by the partner including the part number, the part description, a response to the question whether an alternative site has been qualified, and an End of Life date;

FIG. 18 is a representation of a user interface screen by which a partner can provide answers to questions relating to business continuity planning (BCP)

DETAILED DESCRIPTION OF SPECIFIC EMBODIMENTS

Figure 2:
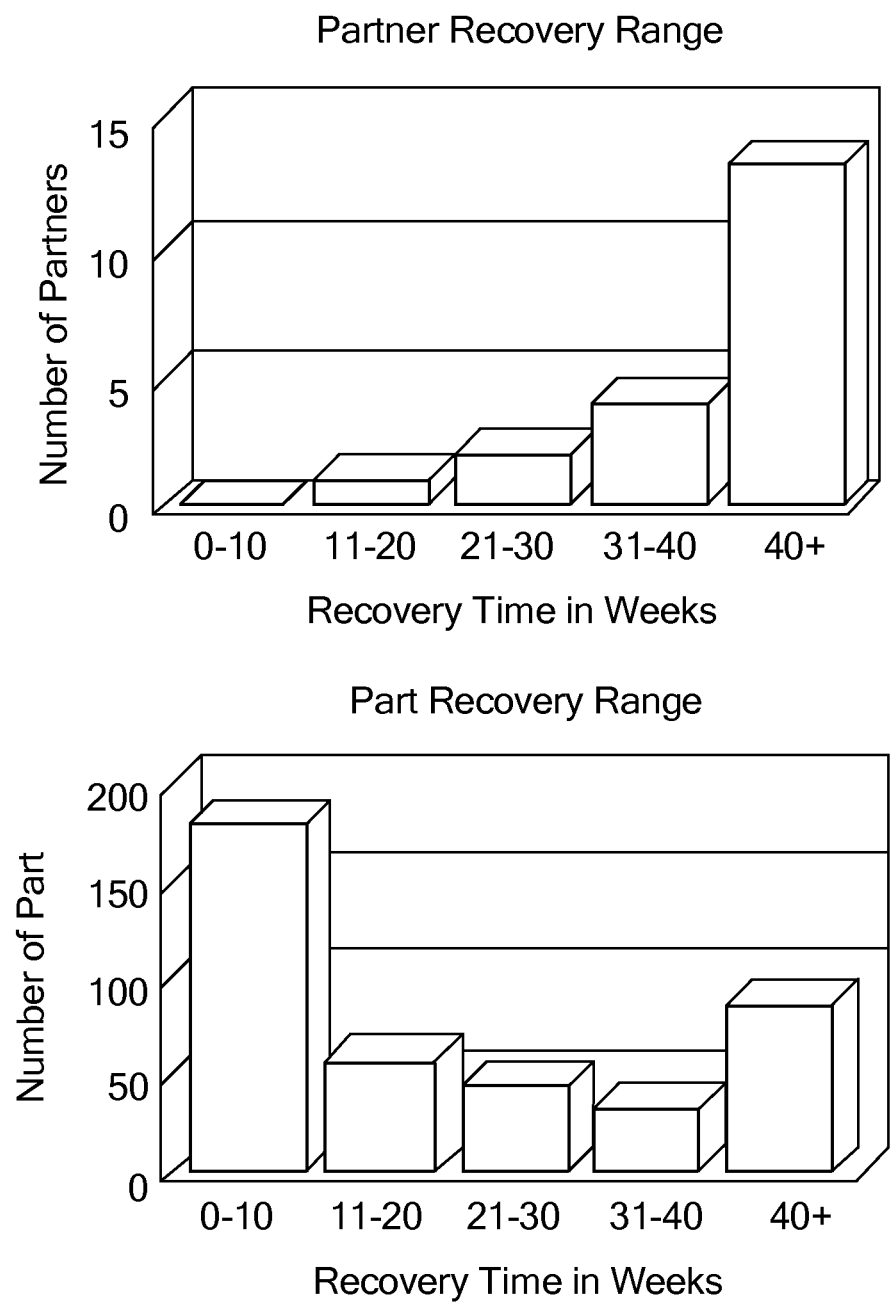
FIG. 2 is a representation of another user report, in this case a pair of recovery range bar graphs showing the distribution of recovery times, that is, the duration of time required to recover from a disruption in supply occurring at partner and part levels, in which the recovery duration is plotted against the number of partners or parts associated with such duration.

Definitions. As used in this description and the accompanying claims, the following terms shall have the meanings indicated, unless the context otherwise requires:

An "alternate site" is a site where the supplier plans to and is capable of recovering operations if the primary site were to be disrupted. Accordingly an "alternate site" is not the primary location where the supplier performs functions critical to supplying the enterprise, such as manufacturing, storage, distribution, etc. A site can be a primary as well as an alternate site; for example, it may be the primary site for the activities that it performs, or parts that it manufactures and will be designated as the alternate for another site in case of a disruption.

An "alternate part" is a part that is a close or newer generation version of a part that is currently being purchased by an enterprise. An alternate part often may not be able to seamlessly replace an existing part on a product (in the event that the existing part is not available). For certain products, using an alternate part on a product might require a lengthy qualification process to be conducted to ensure that the product meets all functional, fit, aesthetic and other important performance criteria.

A "bill of Materials" (BOM) is a mapping of parts and raw materials used in manufacturing the product. The BOM also shows the number of units of each part used in the product. It may have multiple levels to show parent child relationship of a sub-assembly which may be configured separately before being integrated into the overall product.

"Business continuity practices and strategies" refer to the backup plans that a business might have in place to recover its business operations following a disruption. Business continuity practices and strategies include development and training of a crisis response team, business continuity processes, plans to recover labor and personnel, data, systems, power, facilities, equipment, and raw material. Accordingly they may relate to production recovery, facilities and equipment recovery, personnel recovery, power backup, IT redundancy and data recovery.

A "business unit" is a grouping of products and product families that share certain similar characteristics and belong to an organizational group of the enterprise.

A "category" (also called "commodity group") is a group of parts, components or raw material that shares certain similar product, market or other characteristics established for organizational efficiencies of the enterprise.

"Country revenue impact" is a computer determination for a given country, based on a list of sites located there, using supplier provided data, of a list of unique parts built in these sites. The determination further uses a set of bills of material to identify and establish a unique list of products using those parts. For that list of products, the determination is the sum of revenue associated with each such product.

"Delivery reliability" is a computer determination reflecting timeliness of delivery of a part. The determination is based on dates on which are received parts delivered according to a purchase order. When the enterprise places an order for a part, the supplier confirms the delivery date. When the part is delivered, the order commit date is compared with the order receipt date to calculate whether the delivery was late or on time. Delivery reliability is a fraction of orders that are delivered late out of the total number of orders. Delivery reliability may also be a pre-calculated field and a score or rating that can be used in the risk score calculation.

"Demand" is the number of units of a part or component or raw material required by the enterprise over a predetermined duration of time.

A "disruption" is any occurrence wherein the normal course of business of an enterprise is interrupted.

A "dual manufactured" part is a part (or raw material or sub-assembly), supplied to the enterprise, that is furnished from two or more sites; each activity associated with such a part is assigned a lower risk score than if it were single manufactured.

An "enterprise" is a business or governmental organization using an embodiment of the invention herein to evaluate or manage, or both evaluate and manage, its supply chain. An "enterprise" may be, but need not be limited to, a manufacturer, and may alternatively be a retailer or government entity, or a wholesaler. In certain contexts below, we sometimes call the enterprise a "Customer," because the assignee herein is a provider of software that may be used by the enterprise for supply chain evaluation and management.

An "event" is a circumstance giving rise to a disruption.

"Event expenditure impact" is a computer determination of the financial impact of a given event on the expenditure of an enterprise. In making this determination, there is an identified region on a map where an event has occurred, and there is generated a list of sites located in this region based on supplier provided data. Next there is generated a list of unique parts built at this site. Then the current expenditure is calculated as a function of the cost and quantity of the parts, components or raw materials. The expected impact of the event to the cost of the component is taken into account. Additional costs may be incurred during a disruption—the cost of resources spending time in responding, the cost of paying expedited freight or premium prices to acquire the raw material or component or part. This generates event expenditure impact. The event expenditure impact has to be adjusted for the duration of time during which the additional expenditure is expected to be incurred.

"Event revenue impact" is a computer determination of the financial impact of a given event on an enterprise. In making the determination, there is identified a region on a map where the event has occurred, and there is generated a list of sites located in this region based on supplier provided data. Next, there is generated a list of unique parts built in this region. Using the bill of material, there are identified products using those parts, from that identification, there is determined a list of unique products affected by the event, from this determination there is determined a sum of revenue impact associated with each product. The event revenue impact needs to be time bound as different events last for varying amounts of time. The revenue impact has to be converted to the impact that is expected over the duration that the event is expected to last.

"Expenditure" is a computer determined method taking into account the cost of a given part, component or raw material and the volume or quantity of the given part, component or raw material purchased or consumed in a given interval of time.

"Expenditure Impact" denotes the expenditure that is attributed to a given supplier, site, part, country etc.

"Financial risk score" is a computer determined score reflecting the level of financial risk associated with a given supplier or partner. It is usually determined by taking into account financial health determined by the company's financial statements, likelihood of bankruptcy, creditworthiness etc.

"High risk supplier score" is a computer determined score of the number or fraction of suppliers posing one or more of a high financial, location, operational, and recovery risk.

"Inventory" (sometimes called "buffer") refers to units of finished product, semi-finished product, raw material, part or component that may be owned by the enterprise or its suppliers or partners and held in different locations or states of completion.

A "last-time buy date" is a date, associated with a part, established by a supplier for a part being discontinued from sale, by which the enterprise must order the part in quantity sufficient for use over the life of the product, failing which the enterprise must qualify an alternate part.

A "last time buy part" is a part which has a last time buy date occurring within two years of the present time.

A "last time buy score" is a computer determined score based on the number of parts in the product that have a last time buy date within two years.

"Location risk score" is a computer determined score reflecting the level of risk associated with a given site or location. It is usually determined by taking into account the natural disaster risk, geopolitical risk and macro and local economic characteristics of the location etc.

"Manufacturing risk score" is a computer determined score, for product and subassemblies, reflecting the fraction of sites for manufacturing of product or subassemblies, whether in house or outsourced, having one or more of high location, recovery, or (only when manufacturing is outsourced) financial risk.

"Operational risk score is a computer determined score reflecting the supplier or partner's performance as measured against key performance indicators and metrics on an ongoing basis, which may include delivery reliability, history of quality problems with part or raw material being supplied, etc.

A "part" is a component, sub-assembly, or raw material that is used in the manufacturing of a product by the enterprise.

A "partner" (also called a "supplier") is a business organization that supplies, manufactures, stores or distributes parts, subassemblies or raw materials to the enterprise. The supplier may be any one of many different types, such as component supplier, raw material supplier, logistics provider, contract manufacturer, sub-contractor, warehouse provider, or transportation provider.

"Parts recovery time" is a computer determined score reflecting, of all single source parts, the fraction thereof having a long recovery time.

"Part revenue impact" is a computer determination reflecting the product revenue that can be gated by loss of availability of a given part; the determination begins with the bill of material, with respect to which there are first identified all products that use the given part; next there is determined a unique list of products using the part and thereafter a sum of revenue of each such product.

"Part risk score" is a computer determined score reflecting risk to the enterprise of loss of availability of a given part, least for single sourced parts. (If a part is multi-sourced, then the part risk score would be lower.)

"Parts risk score" (a concept different from the above "part risk score" where "part" in the singular) is a computer determined score reflecting the fraction of single-sourced parts having a high "part risk score," as defined, among all parts in the product.

A "primary" site is a site that is the current location where the supplier performs a certain activity such as manufacturing, storage, distribution etc. for a given part or process. A primary site may also be designated as an alternate for another site.

A "product" (also known as an individual "SKU" or "stock keeping unit") is an item, made by the enterprise, that is sold to a customer of the enterprise. A product may include peripheral items, packaging, etc. to facilitate use by the customer.

A "product family" is a group of individual stock keeping units that share foundationally similar characteristics or uses so as to be logically grouped for organizational efficiencies. An enterprise may also choose to group unrelated individual stock keeping units in a Product family.

The "qualification process" for using an alternate part may require the customer to build a prototype of the product using the alternate part and conducting rigorous testing to ensure form, fit and functional criteria are not compromised.

"Recovery time" is a computer determination of the time it takes to recover pre-disruption run rate after a disruption. More particularly, it is the time it takes from the date of occurrence of the event to the date when pre-disruption run rate is recovered. It is inclusive of downtime, qualification time, production lead time, and time to complete any test or qualification efforts, if required.

"Revenue impact" is a computer determination of monetary impact of an event with respect to quantity such as supplier revenue, part revenue, country, site revenue, or event revenue. Revenue impact is calculated by first identifying a unique list of products impacted and then the sum of revenue associated with those products.

"Risk score" is a score used to identify level of risk with respect to an item such as a given part, site, supplier, product, country etc. Usually a risk score reflects financial, location, recovery, and operational parameters.

A "single source dependency score" is a computer determined score reflecting (the fraction of single-sourced parts that are in the parts count in the bill of materials for a product of the enterprise.

A "single sourced part" is a part or raw material or sub-assembly for which only a single supplier is available or approved for use in manufacturing the relevant product.

"Site revenue impact" is a computer determination reflecting the product revenue that can be gated by loss of availability of a given site. It is determined, using supplier provided data, by identifying parts built at that the given site, and thereafter using the bill of materials to determine a unique list of products using such parts and thereafter summing revenue associated with such products.

"Site risk score" is a computer determined score reflecting risk of loss of availability of a given site and is typically determined with respect to financial, location, recovery, operational risks associated with the site.

A "split" of a given supplier is a term applicable when a part is sourced by the enterprise from two or more suppliers, and refers to the quantity of parts purchased from the given supplier divided by the total quantity purchased by the enterprise from all suppliers.

A "stock keeping unit" (also referred to as "SKU" or "product") is an item, made by the enterprise, that is sold to a customer of the enterprise. A stock keeping unit may include peripheral items, packaging, etc. to facilitate use by the customer.

A "supplier" (also called a "partner") is a business organization that supplies, manufactures, stores or distributes parts, subassemblies or raw materials to the enterprise. The supplier may be any one of many different types, such as component supplier, raw material supplier, logistics provider, contract manufacturer, sub-contractor, warehouse provider, or transportation provider.

"Supplier revenue impact" is a computer determination reflecting the product revenue that can be gated by loss of availability of a given supplier; it is determined by, using customer provided data, mapping the given supplier to parts purchased from that supplier. Next, using the bill of materials, the determination includes identifying the products using these parts, from which is generated a list of unique products; of such products there is then determined the sum of revenue attributable to such products.

"Supplier risk score" is a computer determined score reflecting risk of loss of availability of a given supplier and is typically determined with respect to financial, location, recovery, operational risks associated with the supplier.

"Supply chain data are data that pertain to products, parts, suppliers, and sites of an enterprise, examples of which are:

| | |
|---|---|
| For product | bill of material, product historical or forecasted revenue |
| For part | part where used (bill of material), part sourcing (approved suppliers for a given part), inventory on hand, on order, part pricing per supplier, demand units over a given period |
| For supplier or partner | type of supplier (manufacturing, storage, distribution, raw material or component manufacturer etc.), contact information, spend per supplier |

"Time to resume supply" is a computer determination of the time from occurrence of a disruption, to the time the supplier is able to ship the first qualified part to the customer. It is inclusive of downtime, supplier manufacturing time, transit time, supplier time to complete testing and qualification of the part if needed.

"Time to resume supply score" is a computer determined score reflecting the fraction of single source parts having a "time to resume supply" that is longer than the pre-defined threshold, as defined herein.

We now describe how users interact with software that is used in accordance with an embodiment of the present invention. At the highest level, there is the operator (sometimes referred as "the operator") of a web site providing the functionality described herein. There are two main categories of user, Customer and Partner.

A CUSTOMER is an enterprise using an embodiment of the software. Users in the category of CUSTOMER are users who interact with the full functionality of the embodiment. Customer users are of three types: ADMIN USER, a Customer super-user, who helps to set up the software, uploads data, refreshes data, and approves user accounts and access. EXECUTIVE USER, an individual associated with the enterprise who typically accesses high level dashboard, charts, summaries, and crisis notifications. FUNCTIONAL USER, a category or commodity manager, a product supply chain manager, a buyer, or other individual who accesses granular information available with the embodiment and who can also upload and refresh data.

A PARTNER is a supplier (or similar provider) of the Customer and in a category different from the Customer. The Partner can be of many different types (which can be customizable) such as component supplier, raw material supplier, logistics provider, contract manufacturer, sub-contractor, warehouse, transportation provider, etc.

A system in accordance with an embodiment of the present invention identifies and tracks all the physical nodes used by partners, and further distinguishes between a node that is Partner owned and a node that is sub-contracted. (A node is a location where some supply chain-related activity, such as manufacturing or warehousing, is carried out.) If the Partner is using a sub-contractor owned node, then the sub-contractor will be identified and provided very limited access to the system. Only the site level information will be available to view and edit.

An embodiment of a system in accordance with the present invention provides a web-based graphical user interface, wherein a server handles user interaction by serving to one or more computers, operated by various users, web pages that establish and define each user's experience.

The user interface is rich with graphs, dashboard, and charts for quick summary views and for use as decision aids. Different graphs and charts may be accessed by different classes of user depending on role and access granted. The material attached as Appendix 1, relating to an embodiment of the present invention, is hereby incorporated herein by reference.

The dashboard created by an embodiment of the present invention provides a series of charts that a Customer can look at in one page to get a high level representation of supply chain dependencies of the enterprise. FIG. 1 is a representation of a customer report, accessible from the dashboard, in this case a vulnerability scatter plot graph (which we call a vulnerability map), providing to a user a view of critical elements of the supply chain of an enterprise, in which for each of a selectable series of layers of the enterprise, supply chain risk is plotted from a revenue impact and risk score standpoint. The vulnerability map is available at five levels: Partner, Site, Part, Product and Country, and the Customer can select (for example, via a drop down box) which vulnerability map is displayed. The vulnerability map provides a view of critical elements from a revenue impact and risk score standpoint. It is a prioritization tool at a high level that allows business owners to review areas of their supply chain that are most vulnerable to different types of disruptions.

FIG. 2 is a representation of another user report, in this case a pair of recovery range bar graphs showing the distribution of recovery times, that is, the duration of time required to recover from a disruption in supply occurring at partner and part levels, in which the recovery duration is plotted against the number of partners or parts associated with such duration. The number of partners or parts distributed in different recovery time groups shows whether most of the supply chain has long recovery times or short recovery times. It also provides a view of the scale of effort needed. If most of the recovery times are in the larger buckets, it means that there is a greater amount of risk and cost of mitigation is likely to be high.

Figure 3:
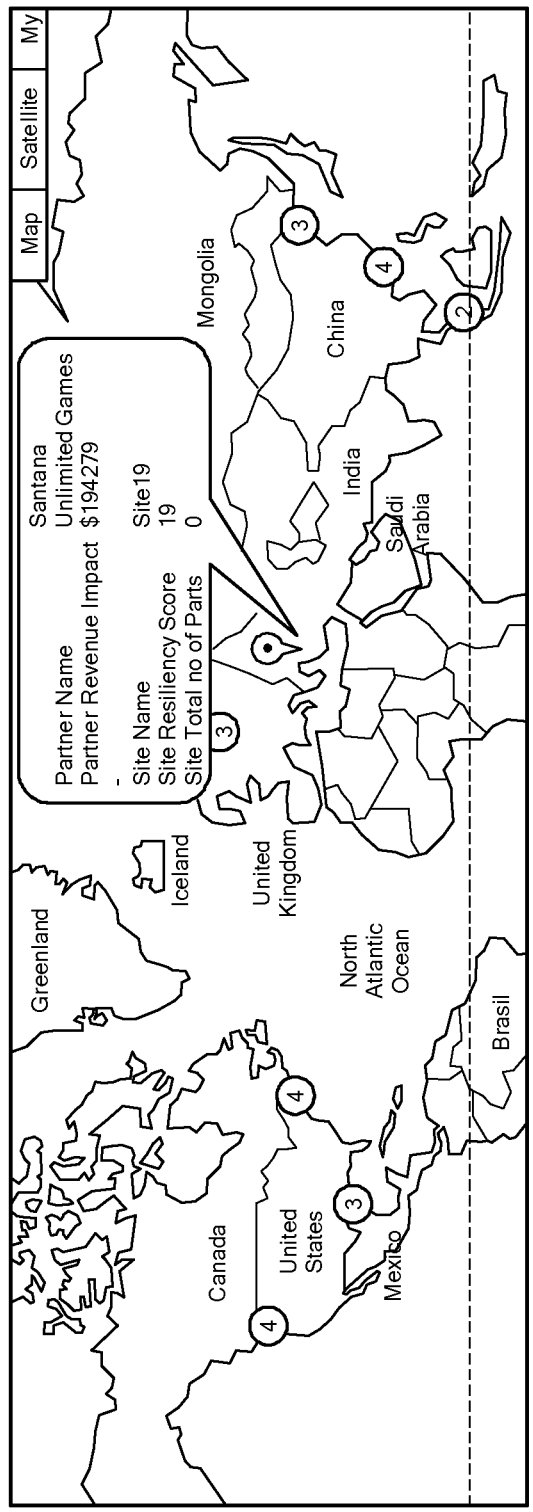
FIG. 3 is a representation of yet another user report, in this case a map showing the regional distribution of supplier locations, wherein sites in each distinct region are grouped together in circles.

FIG. 3 is a representation of yet another user report, in this case a map showing the regional distribution of supplier locations, wherein sites in each distinct region are grouped together in circles. The mapping feature can be accessed to display considerable classes of information. A user can filter the sites for a specific product, supplier, country or part, so as to see in a visually appealing way what regional dependencies are built into the enterprise's supply chain. Zooming into a region will open up pins that are located in specific places to identify a specific site. Clicking on a pin will bring up additional information about the specific site, type of activities, number of single sourced parts, recovery time, location risk score, revenue impact, supplier and sub-contractor names etc.

BCP Reports

Since the operator collects business continuity planning (BCP) data (described in further detail in connection FIG. 17) in an analytical format, using Y/N questions, % of type questions, and questions specifying a numerical answer, a range of analytics are possible using the data. Below are a few examples:

Suppliers who have NO BCP in place
% of suppliers who have site ERTs in place
# of suppliers on Product XYZ who have a low score on their recovery plans
% of Hurricane region suppliers without adequate backup power in place
Earthquake region suppliers without backup power
Suppliers whose BCP is inconsistent with Recovery Time estimates
Comparison of suppliers within an industry type or comparison of sites of similar types Recovery Related Reports Due to the extensive amount of recovery related data collected, embodiments of the present invention can provide customers with different types of analytics around recovery time, supplier mitigation strategy and mitigation cost. Some examples of these:

All single sourced parts with Dual Manufacturing as a mitigation strategy
All single sourced parts with Alt Site Qualified by supplier
All single sourced parts with Recovery Time (RT) >39 weeks and High Revenue impact Risk Related Reports All Single sourced parts from suppliers with Red financials
All single sourced parts from suppliers with Red location AND Red recovery risk Analytics Embodiments of the present invention are inherently analytical in nature, a circumstance giving rise to many different areas where analytical computations are done on data for creating impactful summaries and faster decision aids.

Score computation—Details about score computation are provided in the Algorithm section at the end of this description.

Revenue Impact (as discussed above in connection with FIG. 1)

Supplier Mitigations

DUAL MANUFACTURING—embodiments of the present invention enable partners to upload parts that they build at each site. Wherever a part shows up as being built in two or more sites, for each activity associated with the part, we call this part "Dual Manufactured" and assign a lower risk score to this part.

ALTERNATE SITE QUALIFIED Y/N—When a supplier indicates that they have qualified an alternate site for a part this means that the recovery time for that part should be much lower. The customer can de-prioritize the part or buy a capacity option to ensure they book capacity at the alternate site if needed.

SUPPLIER BUFFERS—At times a supplier might hold high buffer levels for a strategic customer. If this is known then that customer can reduce their risk buffer levels. If the supplier is holding generic buffers to protect all their customers, then it may be possible to pay extra to the supplier to have them dedicate a portion of the buffer to a specific customer. In other words, inventory carrying costs and risks of an enterprise can be transferred from the enterprise to the supplier by knowing the supplier's buffer levels and by paying the supplier to dedicate a portion of generic buffers to the enterprise.

Risk Optimized Inventory

Figure 4:
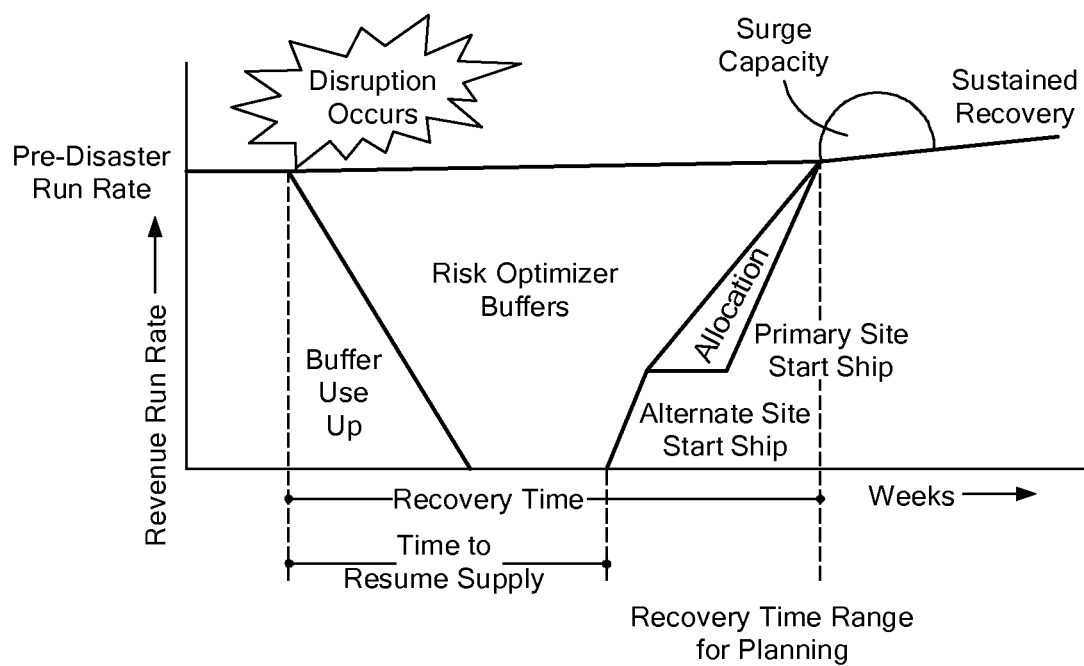
FIG. 4 is a chart illustrating the relationship between concepts, pertinent to embodiments of the invention herein, namely buffer use-up time, time to resume supply, and total recovery time.

FIG. 4 is a chart illustrating the relationship between concepts, pertinent to embodiments of the invention herein, namely buffer use-up time, time to resume supply, and total recovery time. FIG. 4 shows that once a disruption occurs, revenue is reduced at a rate determined by amount of inventory in the supply chain. Once the inventory is used up, production stops and revenue is reduced to zero. This is when downtime commences. Embodiments herein capture the alternate site bring up time (also called Time to Resume Supply). This means some amount of supply is now available, and increasing either in a linear, exponential or other fashion. This supply might be coming from the primary disrupted site or the supplier may have brought up an alternate site. As the supply resumes once more, there is some extra production to reestablish buffer levels throughout the supply chain. Thereafter, revenue is stabilized.

The full recovery time data item does not provide the richness of information that can be gathered by adding two more data items: Supplier buffer levels and Alternate site bring-up time (Time to Resume Supply). Using these two numbers, risk related inventory buffers can be further optimized. The patterned area in FIG. 4 shows the risk optimized inventory levels.

Figure 5:
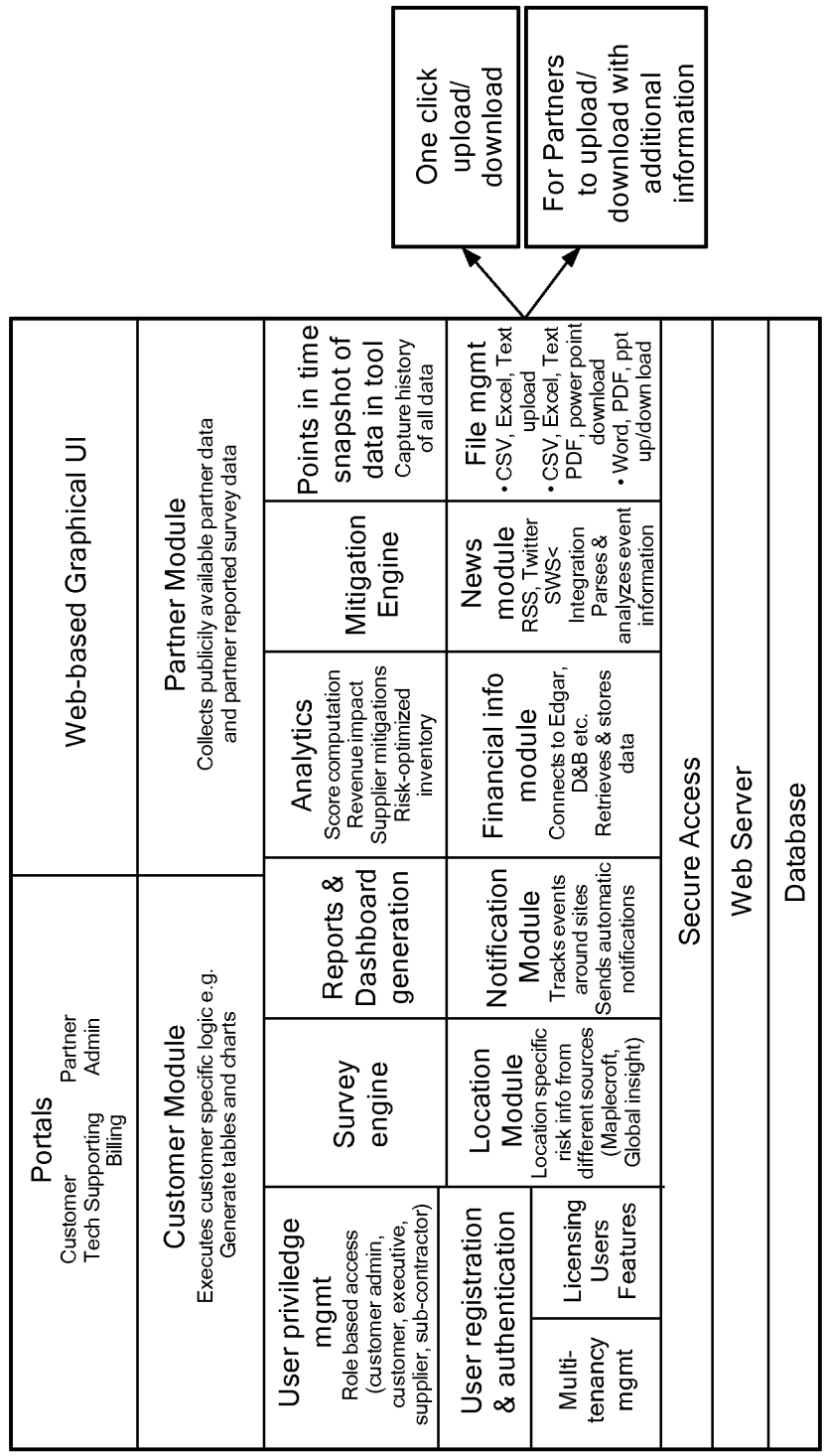
FIG. 5 is a block diagram illustrating logical components of a system in accordance with an embodiment of the present invention as implemented on the Force.com platform.

FIG. 5 is a block diagram illustrating logical components of a system in accordance with an embodiment of the present invention as implemented on the Force.com platform, available from Salesforce.com, Inc., San Francisco, Calif. The actual implementation can vary depending on the underlying software components chosen. For example, using Java would generate one instantiation of the blocks above the "Secure Access" layer, and a different instantiation using PHP. For use with the Force.com platform, the intelligence shown in the above diagram is split into two entities. Note that this architecture is forced by the Force.com platform, and not necessarily required on an alternate platform; indeed, it will be apparent that many features of the present architecture are peculiar to the Force.com platform. The first entity, corresponding to the operator of the site, is called the "Resilinc org" or the "Resilinc Master org" or simply the "Master org." The second entity is called the "Customer org." (In the Salesforce universe, an org or organization is the part of the Salesforce system that is used by a certain organization or company. Salesforce's Multi-tenant platform completely shields each org from all other orgs and does not allow any org to snoop or in any other way access data, login credentials, etc. from other orgs. Explicit software logic has to be implemented to enable data sharing between orgs.) Both orgs implement the bottom three layers. They also implement the "Multi-tenancy management," "Licensing," "File management," "User registration & authentication," "User privilege management," "Points in time snapshot," "Portals" and "Web based Graphic UI" modules. Although the logical components of FIG. 5 have not been implemented directly in the Force.com platform as described, the logical components of FIG. 5 as described provide a good understanding of the functionality that is in fact implemented on the Force.com platform and that can be implemented in other platforms.

The Master org implements the Partner or supplier facing functionality, i.e. the "Partner Module." Only one Master org exits. All partners across all customers log into, and input data into this single org. It is within the scope of the present invention, however, for example, to employ a distinct Master org for customers in each vertical market segment. Thus there can be, e.g., a Master org for High-Tech, another one for Automotive, a third for Retail and so on. All partners (that is, suppliers) access the system of this embodiment via the web interface of the Master org. The data gathering portions of the "Location," "Notification," "Financial info" and "News" modules are implemented in the Master org. The data collection portion of the "Survey engine" is also housed here. The portion of the Event module, responsible for Event creation and update, is also implemented here. A bare bones version of the "Reports & Dashboards" module is implemented here in order to enable display of limited partner information on a map by partner, site, parts, etc. A portion of the Analytics engine exists on the Master org to provide requested data about partner parts.

A dedicated "Customer org" is created for each customer enterprise. For example, if there are enterprise customers Alpha, Bravo and Charlie, we would deploy three independent orgs, one for each customer. The Customer org structure implements all customer facing functionality i.e. the "Customer Module." The "Analytics," "Mitigation" and "Reports & Dashboard" modules are implemented in the customer org.

The embodiment herein described enables the Master org and the customer org to securely exchange data with each other. While we herein describe Salesforce's "Salesforce to Salesforce" or "S2S" functionality to enable this sharing, it is by no means the only way to share data. Other options are possible even on the Force.com platform, and certainly on non-Force.com platforms.

The following is a typical workflow in loading partner data into a customer org:

Customer Alpha creates a new partner called Foxtrot, and provides contact information for this partner.

A request to create this new partner is automatically transmitted to the Master org.

The Master org either approves or rejects this request. If approved, a new partner, Foxtrot, is created in the Master org. An e-mail is automatically sent to the partner asking the partner to register with the Master org. Once the partner registers, the customer request is matched with the partner. If the partner already exists in the Master org, the customer request is matched with the partner.

A Foxtrot user that has registered now logs in and approves sharing Foxtrot's data with Alpha. Then, Foxtrot's information such as emergency contacts, HQ address, DUNS numbers, etc. is transmitted to the Alpha org. Note that at this point, no information about the partner's manufacturing sites, parts, etc. is sent to the customer org.

A registered Foxtrot user can also proceed with uploading Foxtrot's sites, activities performed at the sites, parts manufactured at these sites, site locations, etc.

A user from customer Alpha logs into the Acme org and uploads products, parts used in the products, names of partners that manufacture these parts, inventory details about the parts, product groups and product accounts. The Analytics module processes this information and creates a list of partners and their parts. Because Foxtrot has approved sharing its data with Alpha, the Alpha org transmits a list of Foxtrot parts to the Resilinc org.

The Analytics engine in the Master org processes the request for information about Foxtrot's parts. It goes through all of Foxtrot's data, and complies a set of data related Foxtrot's sites and activities that process the list of parts provided by Alpha. This data is then transmitted to the Alpha org.

In parallel (or otherwise), Foxtrot completes a Resiliency survey at both the company level, and at the site level. It takes one site level survey for each site. The Master org's Analytics engine transmits the survey results to the Alpha org.

The Master org will obtain and then input Location and Financial scores for Foxtrot in the Master org. If the customer has subscribed to the service, the Master org will transmit this data to the Alpha org.

The Alpha org's Analytics module runs the system's proprietary algorithms on all of the data entered by Alpha, as well as that shared by the Resilinc org to derive business intelligence.

The following is the workflow associated with event processing:

An event such as a natural or man-made disaster occurs. The News module learns of this event through a combination of sources such as Twitter, RSS feeds, SMS, e-mail, voice calls, etc.

Intelligence in the Notification module determines the significance of the event and decides if customers could be impacted. If a customer impact is likely, the Analytics module, in conjunction with the Notification module, determines the location of the event and the partners, sites and parts impacted.

The Notification module transmits an event notification to every customer org that has subscribed to the event notification service.

The Analytics module in the customer org processes the event notification and computes the impacted products, groups, accounts, parts, the revenue impact of the disruption, the available inventory for the impacted parts, the recovery time for the parts, products, etc.

The Reports and Dashboard generation module uses the Analytics modules outputs to plot an area of impact on a map. It graphically displays key information such as impacted sites, type of each site (e.g. manufacturing, warehousing, etc.), revenue impact, number of single source parts, number of impacted products, groups, accounts, etc.

The Notification module notifies the customer via an e-mail and SMS.

The above process repeats if the event is updated with more recent information. For example, an event's area of impact may have grown.

The Master org may delete an event in the Master org (e.g. it is old and the situation is resolved, or it was a false alarm). In that case, the Master org's Notification module transmits the update to the customer orgs. The Analytics and Reports & Dashboard modules work together to clear the Event information from the customer org. The Notification module notifies the customer of Event deletion via e-mail and SMS.

The Analytics module combined with the Reports & Dashboards module provide an additional, powerful function to the customer org. A customer can highlight an area on a map and get an instant visual display on the map about the sites, products, parts, various scores, partners, possible disruptive events, etc. in the highlighted area. Details in tabular form about the same are also provided on the same page.

A very powerful, flexible search engine is also built into every customer org. It provides a way to quickly search for items of interest. For example, if a customer wishes to search for a part number, he can enter a partial string and search for it. There is also an advanced search mode available which allows customer org users to provide a combination of multiple different fields (e.g. part number, partner name, product name). When searched this way, the search logic scans across multiple tables, performing lookups, analysis and table joins as required to provide detailed tabular data on partners, products, parts, sites, groups, accounts.

News module details: The News module brings multiple different sources of information together, analyses the same and helps assess the impact of events to supply chains. The term News is used very loosely here because the sources of information are not just restricted to traditional news feeds. Rather, we take a very comprehensive approach to identifying supply chain relevant events. We use the following tools, technologies and concepts to gather event related information:

RSS feeds: The News engine subscribes to RSS feeds across the globe to capture events as they are reported. Feeds in both English and other languages are captured and analyzed. Feeds from news outlets, meteorological agencies, credit agencies, NGOs, government organizations, etc. are subscribed to, and parsed for data.

Twitter and SMS: Increasingly, the most real time information is being reported by civilians as opposed to news outlets using short text formats such as SMS and Twitter. The present embodiment applies Crowd-sourcing to solve supply chain problems. When dealing with Twitter and SMS sources, the embodiment includes mechanisms to help assure trustworthiness of the source. The Master org implements learning algorithms that, over time, learn about a particular source's reliability. The learning is through manual and automated cross checking with well known sources such as AP, police bulletins, etc. Source reliability is also learnt over time via direct customer user input. Customer users are able to rate the reliability of an event notification via a ranking mechanism. The event is tied back by the system to the news source. Over time, a list of trusted and un-trusted sources emerges. We also utilize people in key manufacturing locations such as Taiwan, China's industrial zones, etc. to be our boots on the ground and provide detailed information about events via SMS, Twitter, e-mail, voice call, video chat, etc. To gather event information, we also employ e-mail, voice and video communications, and police and other emergency channels to learn of local events such as fires, chemical spills, strikes and demonstrations, rioting, etc.

Database

Below are the tables or objects in the database and their relationships. The actual database implementation of these tables/objects and their relationships will vary between database types (e.g. the use of primary and foreign keys in RDBMS, or lookup relationships in Salesforce.com combined with programmed logic to establish parent—child, 1:1/1:M/M:N relationships). However, the principle behind the contents of these tables/objects and their relationships will remain the same. Two sets of relationships are shown to indicate two types of relationships between the tables/objects. The first set shows the mapping relationships such as 1:1, 1:M, M:N and the second set shows the relationships in terms of hierarchy (parent—child, lookup).

The schema layout for both the Resilinc and customer orgs is shown in the following pictures. Solid arrows indicate a parent-child relationship. The sharp end of the arrow always points to the Parent (it is a bit counterintuitive). For example, in the Resilinc org data model (schema), the Partner object/table is a parent. Partner part, Site, Cust Request and E Contacts are its children objects. Parent—child relationships are unique in that they form a tree.

Security sharing permissions on a parent (who is allowed access to the object) is inherited by the children down the tree. Deleting the parent will delete the entire tree of information below it. For example, if Alpha deletes partner Foxtrot from its org, all of Foxtrot's sites, activities and parts are deleted from Alpha's org.

A dashed arrow indicates a lookup relationship. The lookup relationship is bidirectional. The blunt end of the arrow is the table with the foreign key to the table with the sharp end of the arrow. This is different from a parent-child relationship in that there are no inherited properties or hierarchical deletions. A lookup relationship allows for a quick lookup of one object from another. For example, in the Customer org schema, Part sourcing has a lookup relationship to Partner Info. When querying the Part sourcing table, the query can be written so that a single query can extract details from both the Part sourcing and the Partner Info tables. This is similar to using a join in a traditional Relational database. When querying the Part Info table, a nested query can be written to extract Part sourcing information for the Partner as well.

Green boxes indicate junction objects. These tables are used to create an M:N relationship between objects. For example, product can have many different parts and a part can be used in many different products. To model this relationship between the Products and Parts tables, the BoM table is created. It is simply a child to both the Product and Part tables. Note that this junction object is implemented because of how Salesforce requires that tables be set up. In a non-Force.com environment, M:N relationships could potentially be done in a completely different manner.

Figure 6:
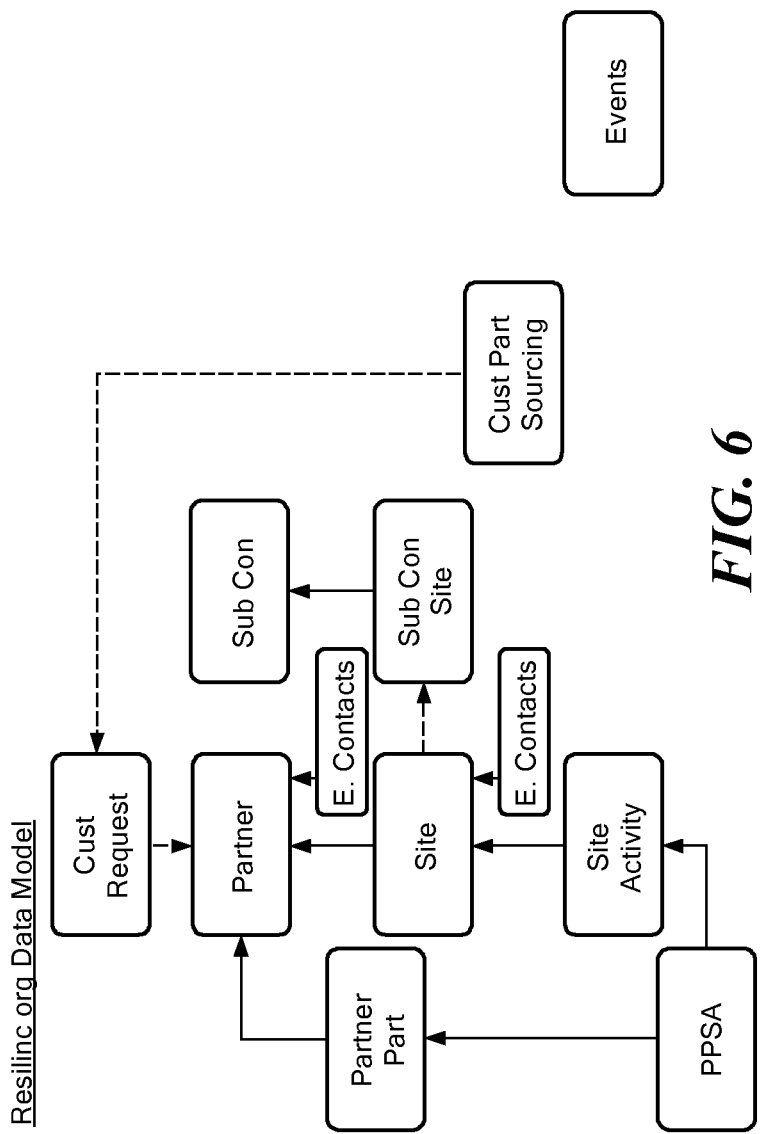
FIG. 6 is a block diagram illustrating logical components of the Master org data model underlying the system of FIG. 5.

FIG. 6 is a block diagram illustrating logical components of the Master org data model underlying the system of FIG. 5. The Partner object/table is the main table in the Resilinc org. It contains details about the Partner such as name, HQ address, contact information, DUNS number, stock id for publicly traded companies, partner level resiliency survey, etc. There is one Partner record for each Partner that has registered with Resilinc. The Site object/table contains all the sites across all of the partners. Each site contains information such as site level survey, site address (for geocoding), whether the site is partner owned or sub-contractor owned, etc. The Site object is a child of the Partner object. Every site record therefore, has a field pointing back to the corresponding partner record. Each Partner and Site can optionally have emergency contact information. The E. Contacts table contains this information. Each emergency contact record has a link back to the parent Partner or Site record.

Every manufacturing, warehousing, etc. site performs a variety of activities. These activities are captured in the Site Activity table, which is a child of the Site table.

Parts manufactured/processed by the Partners are stored in the Partner Parts table, which is a child of the Partner table. A part can be manufactured in multiple sites, and a site can manufacture multiple parts. This many-to-many relationship is captured by the PPSA (Partner Part Site Activity) table which is a child to both Partner Part and Site Activity tables.

Manufacturers sometimes subcontract parts or whole of the manufacturing process. While the customer has a business relationship with the Partner, the Partner has outsourced manufacturing. In these cases, it is important to have the sub-contractor fill out the site level survey and provide location information for the sites. The Sub Con object is similar to the Partner object in that it captures information such as name, contact info, etc. for the sub-contractor. The Sub-Con site table is similar to the Site table.

The Cust Request table holds requests that come in from customers for access to Partners' data. A partner can approve or reject any of the requests that come to it. The Cust Part Sourcing request is a similar concept. Once the customer is approved, the customer org sends a list of part numbers to the Resilinc org, requesting site and site activity information about them. There is no approval or rejection process here. The Resilinc org checks if the partner has approved this customer, and then sends the requested part information to the customer org.

The Event table holds the Events created by the operator in the Resilinc org based on news gathered from sources as described before. This is the Event information that gets transmitted to subscribing customers.

Figure 7:
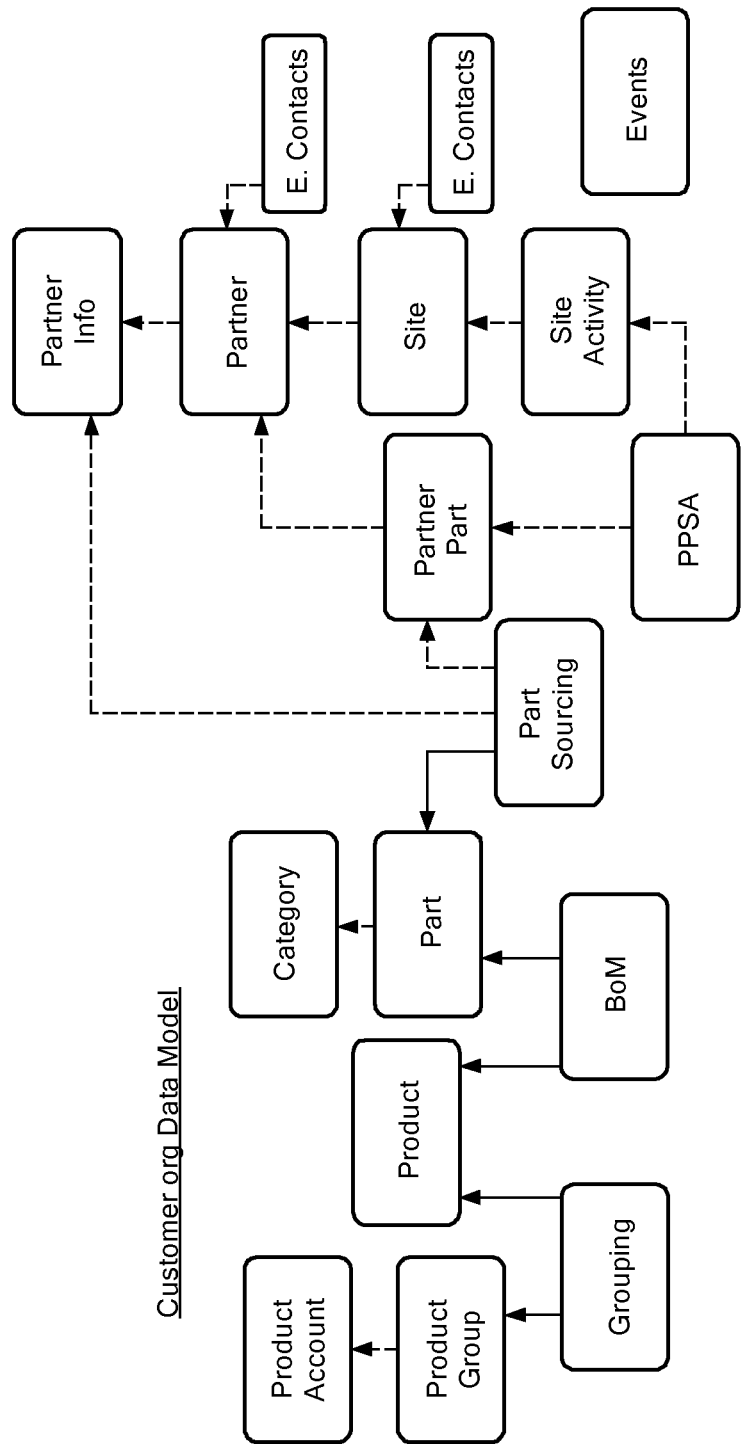
FIG. 7 is a block diagram illustrating logical components of the Customer org data model underlying the system of FIG. 5.

FIG. 7 is a block diagram illustrating logical components of the Customer org data model underlying the system of FIG. 5. The customer org schema is considerably broader compared to that of the Master org because it contains the entire Master org schema, plus a schema specific to the Customer org. The right hand side of the schema is a replication of the Resilinc org schema with one important difference. Because of certain Salesforce limitations, the relationships have been changed from parent-child to lookup. In an embodiment hereof software automatically sets up these relationships as data is received from the Resilinc org.

The portion of the schema on the left hand side is specific to the Customer org and contains customer related information such as products, groups, accounts, parts, etc. Note the two part related objects, one on the left and the other on the right. This is necessary because customers and partners name their parts differently. For example, a customer may call a resistor PN_223344_RESTOR_1 and the partner that manufactures that resistor may call it AAA_89_R.

The customer uploads his parts into the Part table. Each part record has the part's name, the name of the partner that manufactures the part and the name that the partner uses for the part. With this information, the software running in the customer org automatically creates junction objects in the Part Sourcing table for every part that the customer uploads. It is important to bear in mind that a many-to-many relationship is required here because any customer part may be mapped to multiple partner parts (e.g. two partners supplying the same part), and any partner part may be mapped to multiple customer parts (some customers do map the same partner part to different internal part numbers). The Part Sourcing object is the bridge between the customer provided and partner provided data.

The Product table contains information about all of a customer's products. This includes revenue information. The customer uploads a list of parts (called Bill of Materials or BoM) for its products. The software of this embodiment automatically creates the BoM junction objects to map products and parts.

In many cases, customers require grouping products into a hierarchy e.g. product lines, business units, etc. To enable this functionality, the embodiment provides two constructs: Product Group and Product Account. The Product Group is useful in grouping products at product line level e.g. All 40" LCD TVs. A product can belong to multiple groups, and a group can contain multiple products; hence the junction object between Product Group and Product is required. The Product Account table is useful to group products at a higher level e.g. Printer business unit, Lexus division, etc.

All relationships between the various objects/tables are programmatically established the software system.

Figure 8:
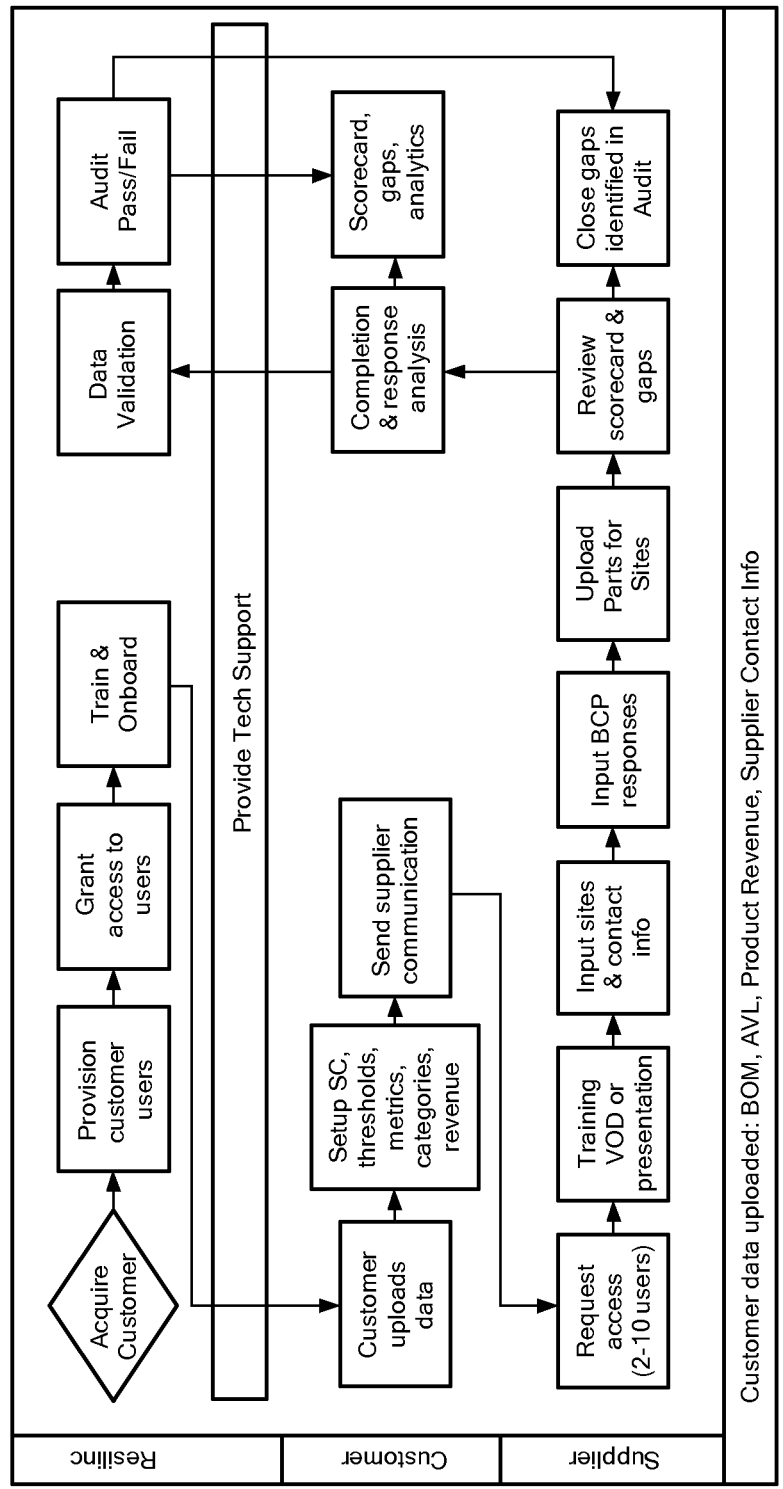
FIG. 8 is a block diagram illustrating processes involved in gathering of data for use in the system of FIG. 5.

FIG. 8 is a block diagram illustrating processes involved in gathering of data for use in the system of FIG. 5.

Figure 9:
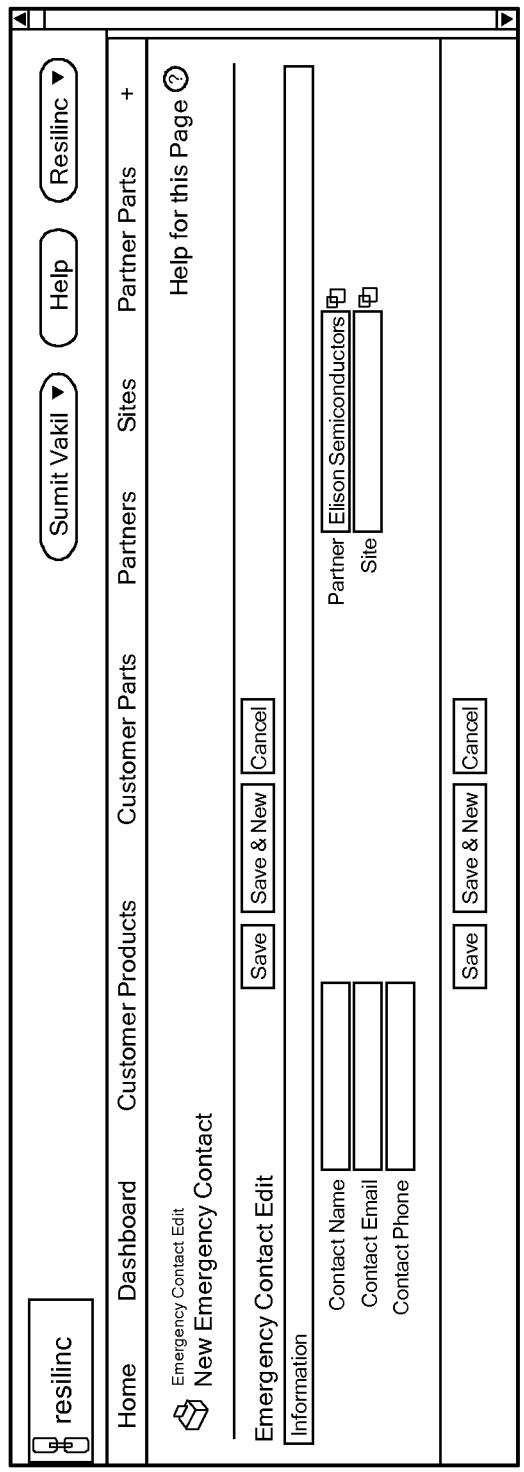
FIG. 9 is a representation of a user interface screen by which can be provided emergency data specific to a given partner (and optionally with respect to a specific site of the partner)

FIG. 9 is a representation of a user interface screen by which can be provided emergency data specific to a given partner (and optionally with respect to a specific site of the partner).

Figure 10:
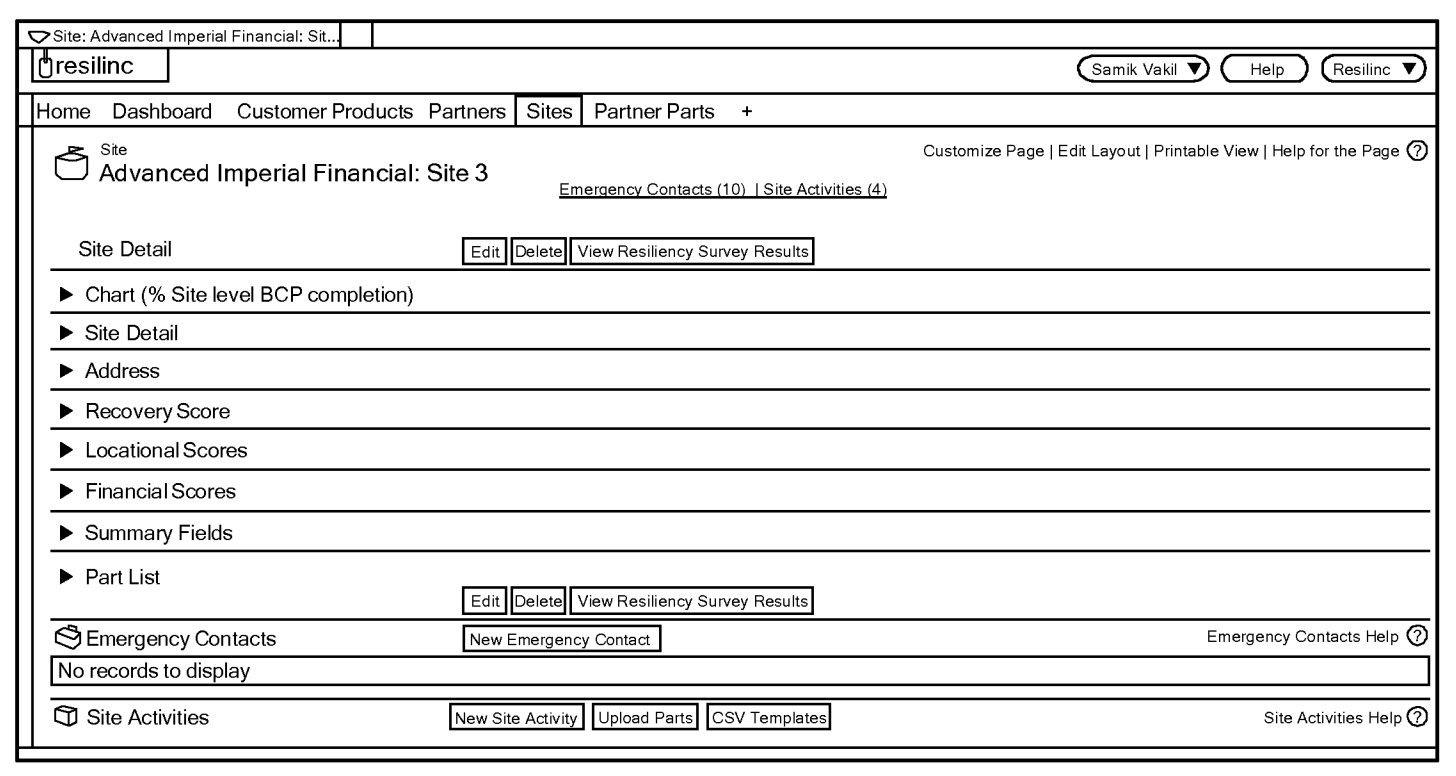

FIG. 10 is a representation of a user interface screen by which a partner can provide data specific to a particular site of the partner. In uploading data, on a web page for a site, the supplier sees the section for sites. In the Sites section, the supplier adds all the sites they use for their manufacturing. The supplier also specifies 1-2 major activities that the site is used for. For example, wafer fab would be a major activity, a specific test conducted after manufacturing would not be indicated. Only broader activities would be provided. This helps differentiate a wafer fab from an assembly test facility. In the view of FIG. 10, all of the sections (e.g., Chart, Site Detail, etc.) are collapsed. Each section can be expanded to show more fields. To edit details about the partner's site, the user can click "Edit" to be taken to a different page that allows providing and editing data for certain fields. Note that not all of the data in this figure is provided by the partner; the scores, for example, are provided by Master.org.

FIG. 11 is a representation of a lower portion of the same screen as in FIG. 10, showing further data that can be provided by a partner with respect to the particular site.

FIG. 12 is a representation of a screen, related to the screen of FIGS. 10 and 11, by which a partner can provide data relating to a particular part supplied by the partner A part upload feature is then available to identify all parts that are undergoing this activity at this site. For this, the supplier opens the CSV template. The supplier pastes the content in the CSV template and saves it to a specific location on their computer. Then supplier checks the activity for which parts are being uploaded. Supplier clicks the Upload Parts button. This brings up the Browse for File page where supplier points to the saved CSV file. Clicking upload associates all the parts with the sites and activities, including the part number, the part description, a response to the question whether an alternative site has been qualified, and an End of Life date. (Of course, alternatively, there may be employed any of a number of other methods by which data may be uploaded.)

Figure 13:
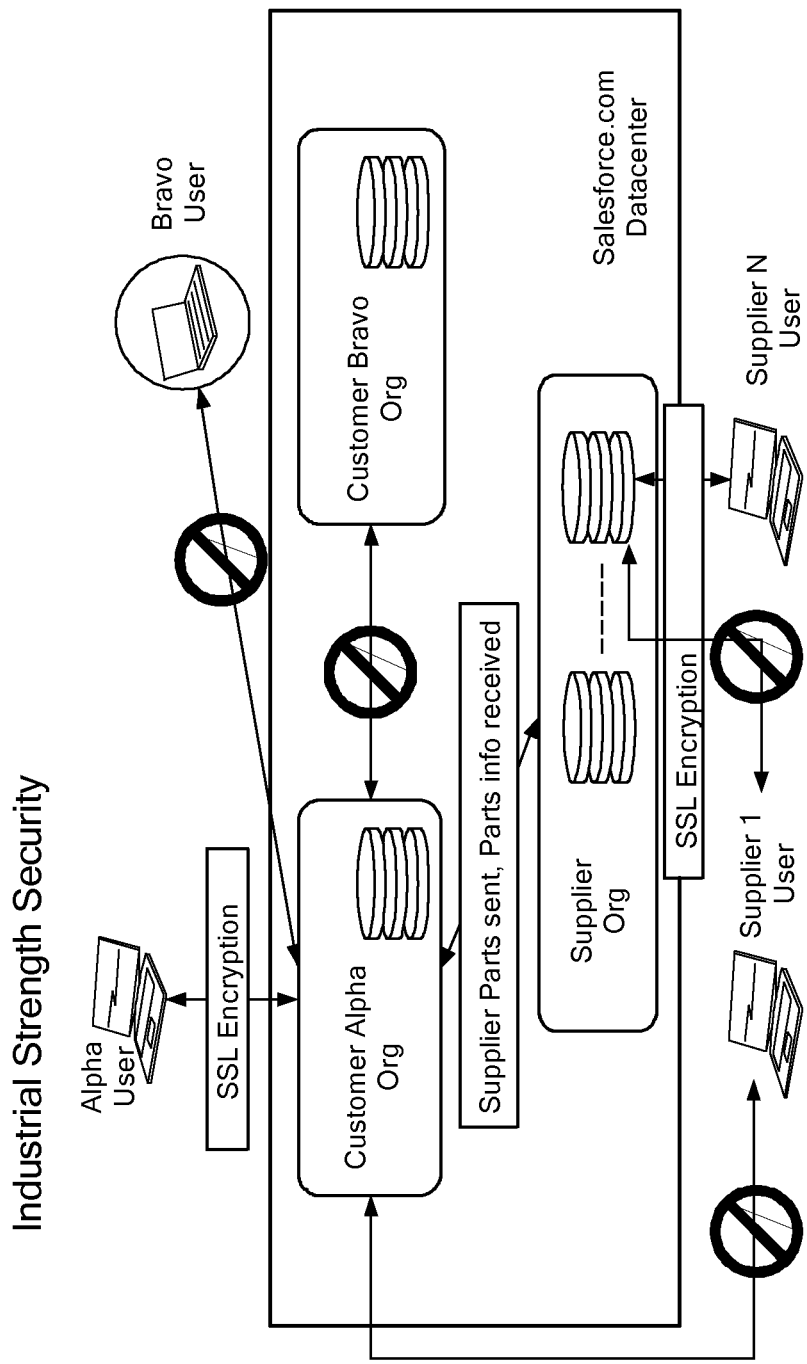
FIG. 13 is a block diagram illustrating user access and security practices followed by the embodiment of FIG. 5 to maintain confidentiality of customer information.

FIG. 13 is a block diagram illustrating user access and security practices followed by the embodiment of FIG. 5 to maintain confidentiality of customer information. A feature of this implementation is to protect a particular partner's data from being viewed or obtained by another partner.

Figure 14:
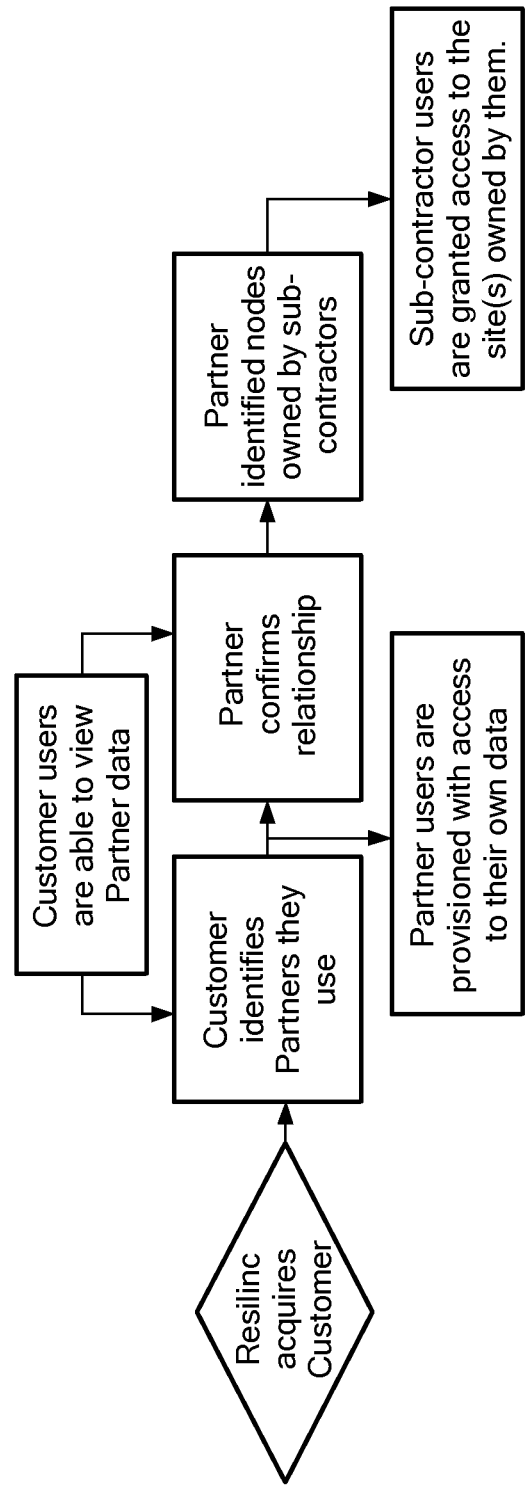
FIG. 14 is block diagram illustrating levels of access to the system of FIG. 5 enjoyed by various classes of users of the system.

FIG. 14 is block diagram illustrating levels of access to the system of FIG. 5 enjoyed by various classes of users of the system. ROLE BASED ACCESS: The user interface and experience is determined by granting role based access to different capabilities of the software. The partner has Read/Write access only to information for their own sites and parts. The partner's sub-contractor has Read/Write access only to the sites that are owned by them. A sub-contractor might assign a user specific to an individual site or one sub-contractor user may manage all the sites owned by that sub-contractor. The customer sees on those partners who have accepted them as a customer. The partner only sees those customers who have acknowledged their relationship.

Figure 15:
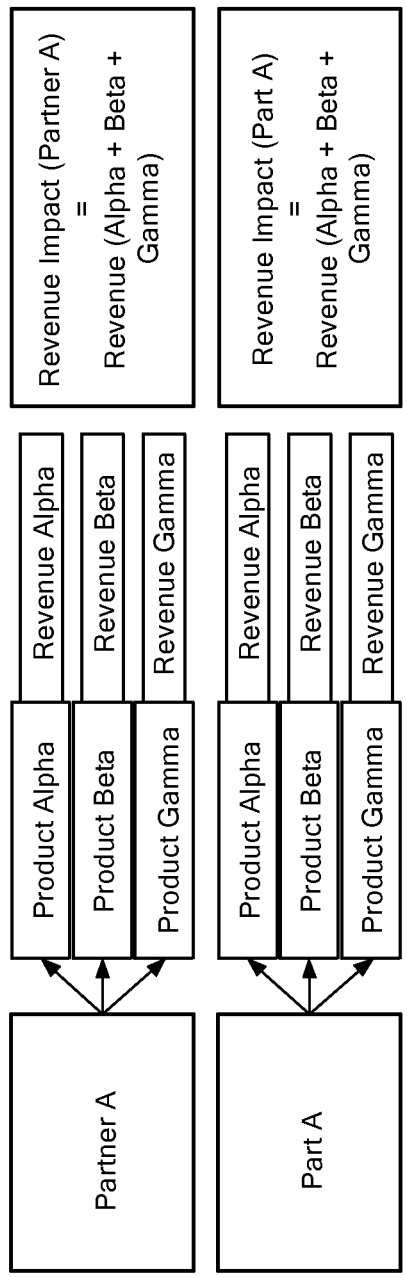
FIG. 15 is a block diagram illustrating analytics processing that is implemented by the system of FIG. 5 as soon as customer data has been uploaded.

FIG. 15 is a block diagram illustrating analytics processing that is implemented by the system of FIG. 5 as soon as customer data has been uploaded. Although this block diagram shows only the revenue calculation, similar calculations are performed for scores as well.

Figure 16:
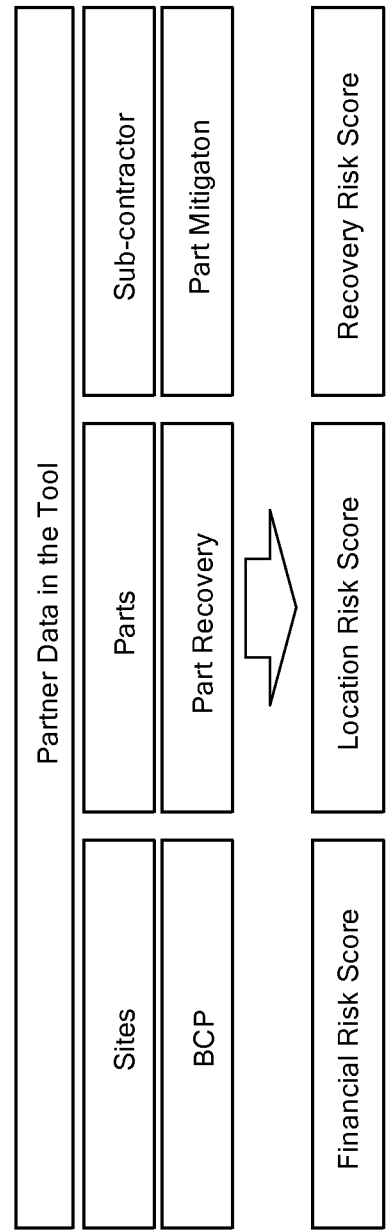
FIG. 16 is a chart showing categories of partner data that are provided to the system of FIG. 5 and the analytical scores, made available to the enterprise user, that the system of FIG. 5 obtains in processing of that data.

FIG. 16 is a chart showing categories of partner data that are provided to the system of FIG. 5 and the analytical scores, made available to the enterprise user, that the system of FIG. 5 determines using algorithms that employ that data.

Figure 17:
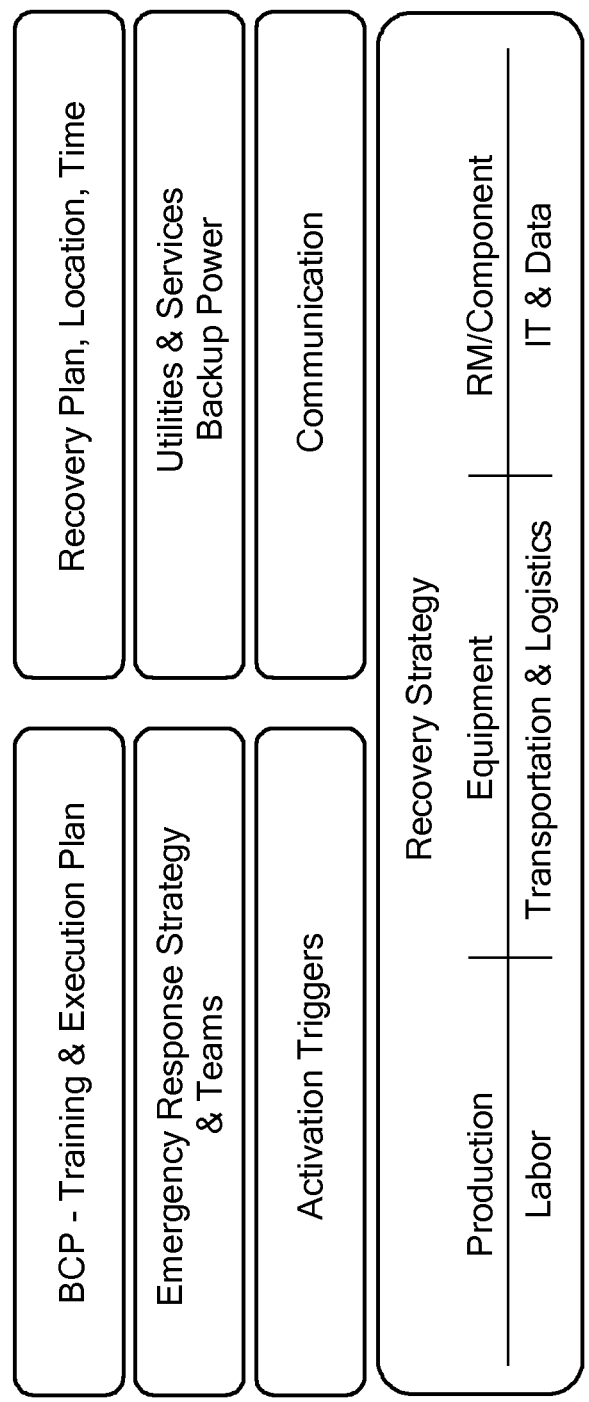
FIG. 17 is a chart showing categories of information that are obtained from a partner relating to business continuity planning (BCP) and other factors affecting recovery time in the event of a disruption.

FIG. 17 is a chart showing categories of information that are obtained from a partner relating to business continuity planning (BCP) and other factors affecting recovery time in the event of a disruption.

FIG. 18 is a representation of a user interface screen by which a partner can provide answers to questions relating to business continuity planning (BCP).

Figure 19:
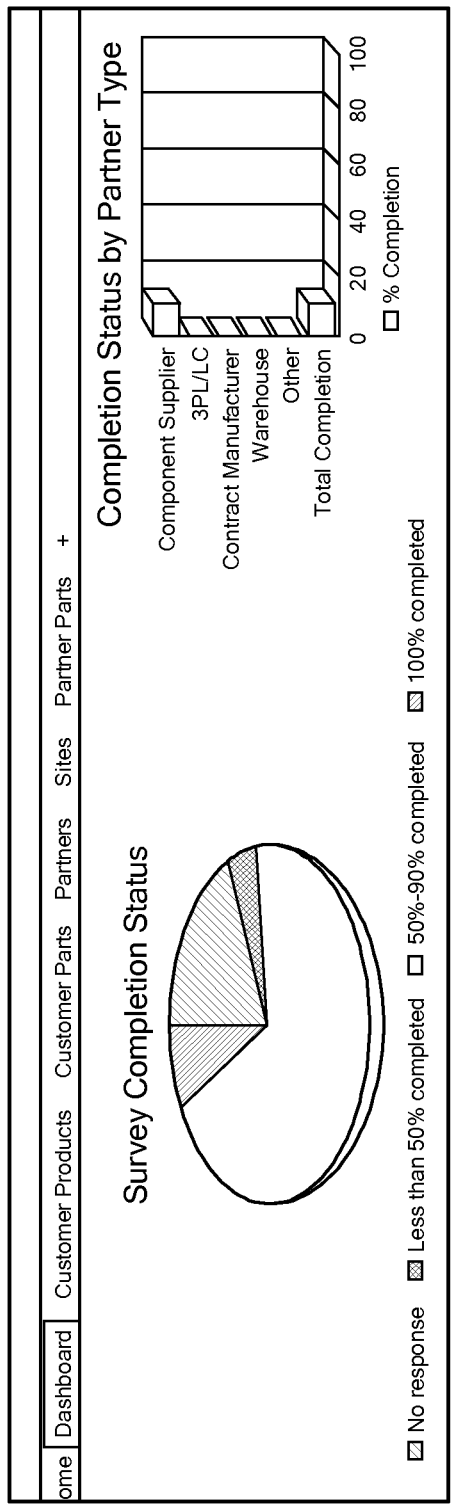
FIG. 19 is a representation of views of a dashboard created by a system in accordance with an embodiment of the present invention, in this case a pie chart showing status of completion by partners of surveys given for purposes of supply chain management and a bar chart showing completion status organized according to partner type.

FIG. 19 is a representation of one of the views of a dashboard created by a system in accordance with an embodiment of the present invention, in this case a pie chart showing overall status of completion by partners of surveys given for purposes of supply chain management and a bar chart showing completion status organized according to partner type.

ALGORITHMS. There are four scores to be computed: the "Recovery risk score," the "Location risk score," the "Financial risk score," and the overall "Risk score." These scores are computed at the Partner, Site and Part level.

The "Recovery risk score" is based on the survey data collected at Site and Partner level. The methods are as follows. For the Site level: The survey questions are laid out in levels, with each level dependent on the previous level. For example, consider the BCP section. "Does your site have a written business continuity plan (BCP)" (Site_c.BCP_Plan_c) is the parent field. "Have you documented personnel at this site that will activate your BCP and execute on the recovery plan?" (Site_c.BCP_Personnel_c) is the second level, and a child of Site_c.BCP_Plan_c. And "Are these responders trained to activate your BCP and execute on the recovery plans?" (Site_c.BCP_Personnel_Trained_c) is the third level and a child of Site_c.BCP_Personnel_c. In computing the Recovery risk score, the parent or first level has a score of 1 for a Yes answer, and 0 for a No answer or for no response. The second level has a score of 0.1 for a Yes answer, and 0 for a No answer or for no response. The third level has a score of 0.01 for a Yes answer, and 0 for a No answer or for no response. For a complete list of scores and question relations, see Table 1 below.

Sum up all of the scores as described above. Then divide the total score by the maximum possible score and multiply by 10. Round the result to the nearest integer e.g. if the result is 3.2, round it to 3; if the result is 6.59, round it to 7. The result will be between 0 and 10. Make sure to do the rounding after the multiplication by 10 and not before i.e. use decimals to do the division and multiplication before rounding. If the result is zero, set it to 1. Then subtract the result from 11 to get the Survey score between 1 and 10. Note that the maximum possible score is the score that you would get if you answered Yes to all of the questions.

Next, find the maximum Recovery time for the site across all of the activities. Then compute the Recovery Time Score. Recovery Time Score=10*Max Recovery Time/52. Round the score to the nearest integer. If the result is zero, set it to 1.

The Recovery risk score is calculated from the Survey and Recovery Time scores. Recovery risk score=0.55*Recovery Time Score+0.45*Survey Score At the Partner level, the Partner Recovery risk score is computed in two steps. In the first step, the Partner level survey questions are used to compute the partial Partner score. The method used is the same as for Sites—first level score is 1 for Yes, 0 otherwise, second level score is 0.1 for Yes, 0 otherwise and third level score is 0.01 for Yes, 0 otherwise. The complete list of scores and question relations is shown in the Table 1 below.

This partial Partner score is combined with the Site level Recovery risk score to derive the overall Partner Recovery risk score: Recovery risk score=0.2*partial Partner score+0.8*Average (Recovery risk score of all of this partner's sites). Round the Recovery risk score above to the nearest integer. If the result of the rounding is zero, set it to 1.

Location risk score. At the Site level: Add the following fields to Site_c→"Location Score," "Natural Disaster Score," "Geopolitical Score," "Macroeconomic Score," "Local Economic Score." These fields should be read only for Partners and Customers. "Location Score" is a computed field. The rest will be entered by the operator in the Master org and copied to the customers' orgs. In the Site detail layout, create a new section called "Locational Scores" to display these fields. The layout should be→Location risk Score/Natural Disaster Score/Geopolitical Score Macroeconomic Score/Local Economic Score.

Location Score=0.3*Natural Disaster Score+0.3*Geopolitical Score+0.2*Macroeconomic Score+0.2*Local Economic Score The four scores that we will enter will all be numbers between 1 and 10.

The Partner level Location risk score is an average of the location risk scores across all of the Partner's sites. The average should be rounded to the nearest integer. If the score is zero after the rounding, set it to 1.

Financial Risk score. Site: The following fields are shown with respect to Site answers "Relationship" with values "Partner Owned" and "Sub-contractor owned." If "Sub-Contractor Owned" is selected, the following additional fields are shown: "Sub-contractor Name," "DUNS Number," "Ticker Symbol," "Sub-Contractor Website." Also the following fields appear: "Financial Risk Score," "Health Score," "Z-score," "Debt Rating Score," "Credit Risk Score." These fields are not shown to Partners and Sub-Contractors and are read-only for Customers. "Financial Risk Score" is a computed field. The rest are entered by the operator of the Master org and copied to the customers' orgs. In the Partner detail layout, a section called "Financial Scores" displays these fields. The layout is→
Financial Risk Score/Health Score/Z-score Debt Rating Score Credit Risk Score.

Financial Risk Score=0.3*Health Score+0.3*Z-score+0.2*Debt Rating Score+0.2*Credit Risk Score The four scores that we will enter are all numbers between 1 and 10. One checkbox (called "Override Financial Risk Score") is required here so our customer can override the Financial Risk Score. If the customer selects this field, he can enter a value in a field called "Override Financial Risk Score." When the customer does this, the "Financial Risk Score" field is set to the "Override Financial Risk Score" value.

Partner: The following fields are used for Partner_c→"Financial Risk Score," "Health Score," "Z-score," "Debt Rating Score," and "Credit Risk Score." These fields are read only for Partners and Customers. "Financial Risk Score" is a computed field. The rest are entered by the operator in the Master org and copied to the customers' orgs. In the Partner detail layout, a section called "Financial Scores" displays these fields. The layout is→Financial Risk Score Health Score/Z-score/Debt Rating Score/Credit Risk Score.

Financial Risk Score=0.3*Health Score+0.3*Z-score+0.2*Debt Rating Score+0.2*Credit Risk Score The four scores that we enter are all numbers between 1 and 10. One checkbox (called "Override Financial Risk Score") enables the customer to override the Financial Risk Score. If the customer selects this field, he can enter a value in a field called "Override Financial Risk Score." When the customer does this, the "Financial Risk Score" field is set to the "Override Financial Risk Score" value.

The overall risk score is calculated from the above three scores. The method to compute the score is the same for both Sites and Partners: Risk score=0.45*Financial Risk Score+0.25*Location Score+0.3*Recovery risk score

TABLE 1

Recovery Risk scoring. For each answer, if the value chosen is Yes, use the following values for the score. If the value chosen is No or no value is chosen, use 0.

| Field | Score | Parent |
| --- | --- | --- |
| Site_c.BCP_Plan_c | 1 | — |
| Site_c.BCP_Triggers_c | 0.1 | BCP_Plan_c |
| Site_c.BCP_Personnel_c | 0.1 | — |
| Site_c.BCP_Personnel_Trained_c | 0.01 | BCP_Personnel_c |
| Site_c.BCP_Tested_c | 0.1 | — |
| Site_c.BCP_Gaps_Plan_c | 0.01 | BCP_Tested_c |
| Site_c.BCP_Backup_c | 0.1 | — |
| Site_c.BCP_Equipment_c | 0.1 | — |
| Site_c.Comms_Equipment_c | 1 | — |
| Site_c.Comms_Team_c | 1 | — |
| Site_c.Risk_Types_c | 1 | — |
| Site_c.Risk_Protection_c | 0.1 | Risk_Types_c |
| Site_c.ERT_Personnel_c | 1 | — |
| Site_c.ERT_Contact_c | 0.1 | — |
| Site_c.ERT_Contracts_c | 1 | — |
| Site_c.ERT_Facility_Restore_c | 0.1 | ERT_Contracts_c |
| Site_c.ERT_Repair_c | 0.1 | ERT_Contracts_c |
| Site_c.Transportation_c | 1 | — |
| Site_c.Labor_Issue_c | 1 | — |

TABLE 1-continued

Recovery Risk scoring. For each answer, if the value chosen is Yes, use the following values for the score. If the value chosen is No or no value is chosen, use 0.

| Field | Score | Parent |
|---|---|---|
| Site_c.Labor_Site_Output_Percent_c | A % value is provided here. If the value is provided and not zero, then use 0.1, else use 0. | Labor_Issue_c |
| Site_c.Alt_Ops_c | 1 | — |
| Site_c.Alt_Guidelines_c | 0.1 | Alt_Ops_s |
| Site_c.Alt_Relocation_c | 0.1 | Alt_Ops_s |
| Site_c.Alt_Contracts_c | 0.1 | Alt_Ops_s |
| Site_c.Alt_Transfer_c | 0.1 | Alt_Ops_s |
| Site_c.Alt_Output_c | A % value is provided here. If the value is provided and not zero, then use 0.1, else use 0. | Alt_Ops_c |
| Site_c.Security_c | 1 | — |
| Site_c.Safety_c | 1 | — |
| Site_c.Safety_Materials_c | 0.1 | Safety_c |
| Site_c.Safety_Sprinklers_c | 1 | — |
| Site_c.Safety_Alarms_c | 1 | — |
| Site_c.Safety_Equipment_c | 1 | — |
| Site_c.Safety_Safeguards_c | 1 | — |
| Site_c.Safety_Maintenance_c | 1 | — |
| Site_c.Power_Backup_c | 1 | — |
| Site_c.Power_Contract_c | 0.1 | Power_Backup_c |
| Site_c.Power_Test_c | 0.1 | Power_Backup_c |
| Site_c.Power_IT_Equipment_c | Checkbox. Use 0.1 if selected, and 0 if not selected. | Power_Backup_c |
| Site_c.Power_Lights_c | Checkbox. Use 0.1 if selected, and 0 if not selected. | Power_Backup_c |
| Site_c.Power_Climate_Control_c | Checkbox. Use 0.1 if selected, and 0 if not selected. | Power_Backup_c |
| Site_c.Power_Manufacturing_Lines_c | Checkbox. Use 0.1 if selected, and 0 if not selected. | Power_Backup_c |
| Site_c.Power_Test_Equipment_c | Checkbox. Use 0.1 if selected, and 0 if not selected. | Power_Backup_c |
| Site_c.IT_Documentation_c | 1 | — |
| Site_c.IT_Data_Backup_c | 1 | — |
| Site_c.IT_Manual_Ops_c | 1 | — |
| Site_c.IT_Redundancy_Daily_Data_c | 1 | — |
| Site_c.IT_Redundancy_Weekly_Data_c | 1 | — |
| Site_c.IT_Redundancy_Data_Comms_c | 1 | — |
| Site_c.IT_Redundancy_Voice_Comms_c | 1 | — |
| Site_c.Partner_BCP_Collected_c | 1 | — |
| Site_c.Partner_BCP_Frequency_c | An integer value is provided here. If the value is provided and not zero, then use 0.1, else use 0. | Partner_BCP_Collected_c |
| Site_c.Partner_BCP_Provided_c | A % value is provided here. If the value is provided and not zero, then use 0.1, else use 0. | Partner_BCP_Collected_c |

TABLE 1-continued

Recovery Risk scoring. For each answer, if the value chosen is Yes, use the following values for the score. If the value chosen is No or no value is chosen, use 0.

| Field | Score | Parent |
|---|---|---|
| Site_c.Partner_BCP_Audit_c | 0.1 | Partner_BCP_Collected_c |
| Site_c.Partner_Single_Sourced_Percent_c | A % value is provided here. If the value is provided and not zero, then use 0.1, else use 0. | Partner_BCP_Collected_c |
| Site_c.Partner_BCP_Single_Source_c | 0.1 | Partner_BCP_Collected_c |
| Site_c.Partner_Single_Source_Reduce_c | 0.1 | Partner_BCP_Collected_c |
| Partner_c.BCP_Has_Plan_c | 1 | |
| Partner_c.BCP_Mgmt_Approved_c | 0.1 | |
| Partner_c.BCP_Reviewed_c | 0.1 | |
| Partner_c.BCP_Staff_Aware_c | 0.1 | |
| Partner_c.BCP_Triggers_c | 0.1 | |
| Partner_c.BCP_Tested_c | 0.1 | |
| Partner_c.BCP_Mfg_Sites_Covered_Percent_c | A % value is provided here. If the value is provided and not zero, then use 0.1, else use 0. | |
| Partner_c.BCP_Percent_Sites_c | A % value is provided here. If the value is provided and not zero, then use 0.01, else use 0. | |
| Partner_c.BCP_Training_Interval_c | An integer value is provided here. If the value is provided and not zero, then use 0.1, else use 0. | |
| Partner_c.Pandemic_c | 1 | |
| Partner_c.Pandemic_Critical_c | 1 | |
| Partner_c.Pandemic_Training_c | 0.1 | |
| Partner_c.Pandemic_Contact_Info_c | 0.1 | |
| Partner_c.ERT_Documented_c | 1 | |
| Partner_c.ERT_Responders_c | 0.1 | |
| Partner_c.ERT_Trained_c | 0.1 | |
| Partner_c.Risks_c | 1 | |
| Partner_c.Comms_c | 1 | |
| Partner_c.Insurance_c | 1 | |

The embodiments of the invention described above are intended to be merely exemplary; numerous variations and modifications will be apparent to those skilled in the art. All such variations and modifications are intended to be within the scope of the present invention as defined in any appended claims.

A system for presenting data relating to a supply chain of an enterprise has been described. Such a system may be implemented by a processor controlled by instructions stored in a memory. The memory may be random access memory (RAM), read-only memory (ROM), flash memory or any other memory, or combination thereof, suitable for storing control software or other instructions and data. Some of the functions performed by the system or method for presenting data relating to a supply chain of an enterprise have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-transitory, non-writable storage media (e.g. read-only memory devices within a computer, such as ROM, or devices readable by a computer I/O attachment, such as CD-ROM or DVD disks), information alterably stored on non-transitory writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of system or method for presenting data relating to a supply chain of an enterprise have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A supply chain management server system, programmed to provide a platform for use by each of a plurality of enterprises, wherein each enterprise has vulnerability to disruption in supply from its suppliers, the platform providing efficient data gathering and an interactive visual presentation of results of characterization of the vulnerability, wherein the server system runs processes comprising, for each enterprise of the plurality of enterprises:

receiving, over a wide area network, by a server system, from at least a first computer of the enterprise, parts data including (1) content of a bill of materials, which constitutes a mapping of parts and raw materials used in manufacturing a product or a group of products, (2) a list of approved sources for each of the parts, and (3) for each part in the bill of materials and each approved source for such part, risk data associated therewith;

storing, by the server system, the received parts data;

receiving, by the server system, from at least one computer of each one of the approved sources, over a wide area network, supplier data, for such one of the sources, including manufacturing, distribution, and storage locations;

storing by the server system, the received supplier data in a supplier database;

using by the server system the stored parts data and the stored supplier data in a first computer process to compute and to aggregate supply chain data according to geographic region, including to determine a supply chain measure based on risk score, which is a score that measures level of risk with respect to an item, and an impact measurement selected from the group consisting of (a) revenue impact, which is a monetary measure of effect on revenue of losing raw material, and (b) expenditure impact, which is a monetary measure of expenditure that is attributed to losing raw material, the supply chain measure corresponding to the at least one of the product and the group of products of the enterprise; and serving, by the server system, over the wide area network, to at least a second computer of the enterprise, data characterizing a visual representation of an interactive graphical vulnerability map for at least one of the product and the group of products of the enterprise, for display on a client computer of the enterprise, wherein the vulnerability map responds to graphical selection, by the user, of a geographic region by displaying at least a portion of the computed supply chain data including the supply chain measure for the selected region;

so that the received parts data and the received supplier data are collectively transformed first into the supply chain measure according to geographic region and second into the interactive graphical vulnerability map.

2. A server system according to claim 1, wherein the supply chain measure is based on both revenue impact and risk score.

3. A server system according to claim 1, wherein the supply chain measure is based on both expenditure impact and risk score.

4. A server system according to claim 1, wherein the supply chain measure is based on revenue impact, expenditure impact, and risk score.

5. A non-transitory digital storage medium encoded with computer instructions, which, when executed by a server system, transforms the server system into a supply chain management server system that provides a platform, for use by each of a plurality of enterprises, wherein each enterprise has vulnerability to disruption in supply from its suppliers, the platform providing efficient data gathering and an interactive visual presentation of results of characterization of the vulnerability, wherein the server system runs processes comprising, for each enterprise of the plurality of enterprises:

receiving, over a wide area network, by the server system, from at least a first computer of the enterprise, parts data including (1) content of a bill of materials, which constitutes a mapping of parts and raw materials used in manufacturing a product or a group of products, (2) a list of approved sources for each of the parts, and (3) for each part in the bill of materials and each approved source for such part, risk data associated therewith;

storing, by the server system, the received parts data;

receiving, by the server system, from at least one computer of each one of the approved sources, over a wide area network, supplier data, for such one of the sources, including manufacturing, distribution, and storage locations;

storing by the server system, the received supplier data in a supplier database;

using by the server system the stored parts data and the stored supplier data in a first computer process to compute and to aggregate supply chain data, according to geographic region, including to determine a supply chain measure based on risk score, which is a score that measures level of risk with respect to an item, and an impact measurement selected from the group consisting of (a) revenue impact, which is a monetary measure of effect on revenue of losing raw material, and (b) expenditure impact, which is a monetary measure of expenditure that is attributed to losing raw material, the supply chain measure corresponding to the at least one of the product and the group of products of the enterprise; and serving, by the server system, over the wide area network, to at least a second computer of the enterprise, data characterizing a visual representation of an interactive graphical vulnerability map for at least one of the product and the group of products of the enterprise, for display on a client computer of the enterprise, wherein the vulnerability map responds to graphical selection, by the user, of a geographic region by displaying at least a portion of the computed supply chain data including the supply chain measure for the selected region;

so that the received parts data and the received supplier data are collectively transformed first into the supply chain measure according to geographic region and second into the interactive graphical vulnerability map.

6. A digital storage medium according to claim 5, wherein the supply chain measure is based on both revenue impact and risk score.

7. A digital storage medium according to claim 5, wherein the supply chain measure is based on both expenditure impact and risk score.

8. A digital storage medium according to claim 5, wherein the supply chain measure is based on revenue impact, expenditure impact, and risk score.

9. A supply chain management server system according to claim 1, wherein, for a given one of the enterprises, the processes of receiving and storing the supplier data exclude receiving and storing a subset of the supplier data that is already in the supplier database as a consequence of having been previously received and stored in connection with one or more other ones of the plurality of enterprises.

10. A non-transitory vulnerability map made according to the method of claim 1.

\* \* \* \* \*